(12) United States Patent
Jang

(10) Patent No.: US 10,791,278 B2
(45) Date of Patent: Sep. 29, 2020

(54) MONITORING APPARATUS AND SYSTEM

(71) Applicant: HANWHA TECHWIN CO., LTD., Seongnam-si (KR)

(72) Inventor: Se Mi Jang, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/981,088

(22) PCT Filed: Jul. 22, 2016

(86) PCT No.: PCT/KR2016/000799
§ 371 (c)(1),
(2) Date: May 16, 2018

(87) PCT Pub. No.: WO2018/004055
PCT Pub. Date: Jan. 4, 2018

(65) Prior Publication Data
US 2019/0132523 A1 May 2, 2019

(30) Foreign Application Priority Data
Jun. 29, 2016 (KR) .................... 10-2016-0081290

(51) Int. Cl.
*H04N 5/232* (2006.01)
*G06F 3/0484* (2013.01)
(Continued)

(52) U.S. Cl.
CPC ....... *H04N 5/23299* (2018.08); *G06F 3/0482* (2013.01); *G06F 3/0486* (2013.01);
(Continued)

(58) Field of Classification Search
CPC ............ H04N 5/23299; G06F 3/04815; G06F 3/04817; G06F 3/04847; G06F 3/0485; G06F 3/04855
See application file for complete search history.

(56) References Cited

U.S. PATENT DOCUMENTS 8,838,276 B1 * 9/2014 Desai ................. H04N 5/23206
348/207.11
2002/0067412 A1 * 6/2002 Kawai .................... H04N 5/232
348/211.99
(Continued)

FOREIGN PATENT DOCUMENTS

JP 10-093855 A 4/1998
JP 2008-301034 A 12/2008
(Continued)

OTHER PUBLICATIONS

Search Report dated Mar. 20, 2017, issued by the International Searching Authority in counterpart International Patent Application No. PCT/KR2016/007991 (PCT/ISA/210).

*Primary Examiner* — Daniel M Pasiewicz
(74) *Attorney, Agent, or Firm* — Sughrue Mion, PLLC

(57) ABSTRACT

A monitoring device is disclosed. The monitoring device includes a display configured to display an image acquired by a camera; and a processor configured to: control the display to display a panning control icon including an area corresponding to a panning range of the image, detect an input of selecting one point from the area of the panning control icon, determine a target panning direction based on a position of the selected one point on the panning control icon, perform panning on the image in the target panning direction, and display a direction marker at the position of the selected one point.

19 Claims, 36 Drawing Sheets

(51) Int. Cl.
  *G06F 3/0485* (2013.01)
  *H04N 7/18* (2006.01)
  *G06F 3/0481* (2013.01)
  *G06F 3/0482* (2013.01)
  *G06F 3/0486* (2013.01)

(52) U.S. Cl.
  CPC ...... *G06F 3/04815* (2013.01); *G06F 3/04817* (2013.01); *G06F 3/04847* (2013.01); *G06F 3/04855* (2013.01); *H04N 5/232* (2013.01); *H04N 7/18* (2013.01)

(56) References Cited

U.S. PATENT DOCUMENTS

| | | | |
|---|---|---|---|
| 2002/0191080 A1* | 12/2002 | Terada | H04N 5/2259 348/207.1 |
| 2011/0085016 A1* | 4/2011 | Kristiansen | G06F 3/04883 348/14.03 |
| 2012/0007999 A1* | 1/2012 | Horii | H04N 5/232 348/211.4 |
| 2012/0057037 A1* | 3/2012 | Ono | H04N 5/225 348/211.9 |
| 2012/0307052 A1* | 12/2012 | Thiruvengada | H04N 7/183 348/143 |
| 2017/0150031 A1* | 5/2017 | Oshima | G03B 17/02 |

FOREIGN PATENT DOCUMENTS

| | | |
|---|---|---|
| KR | 10-2011-0004674 A | 1/2011 |
| KR | 10-2011-0068683 A | 6/2011 |
| KR | 10-1082845 B1 | 11/2011 |
| KR | 10-1505198 B1 | 3/2015 |
| KR | 10-1648564 B1 | 8/2016 |

\* cited by examiner

MONITORING APPARATUS AND SYSTEM

CROSS-REFERENCE TO THE RELATED APPLICATION

This application is a continuation of International Application No. PCT/KR2016/007991, which was filed on Jul. 22, 2018, and claims priority from Korean Patent Application No. 10-2016-0081290, which was filed in the Korean Intellectual Property Office on Jun. 29, 2016, the disclosure of which is incorporated herein by reference in its entirety.

BACKGROUND

1. Field

Exemplary embodiments disclosed herein relate to a monitoring device and system, and more particularly, to a monitoring device and system capable of easily panning or tilting an image with a simple manipulation.

2. Description of the Related Art

Monitoring systems are widely used in various locations such as a bank, a department store, a general residential area, etc. Such monitoring systems may be used for the purpose of crime prevention and security, but, in recent years, have also been used for monitoring a pet or child in an indoor space in real time. One of the most commonly used systems is a closed circuit television (CCTV) system in which a camera is installed at a proper position to capture an area desired to be monitored, and a user is capable of monitoring by monitoring an image captured by the camera.

However, in the case of a general front-view camera, since the angle of view range is limited, when a monitoring target moves out of the angle of view, the monitoring object is prone to be missed. Therefore, pan, tilt, and zoom (PTZ) functions for an image are essential. Recently, people's attention on the development of user interface (UI)/user experience (UX) for user convenience capable of easily performing such PTZ functions has been increased.

Recently, an angle range in which a camera may be panned or tilted has been increased. As such, numerous cameras capable of capturing an image with a very wide angle of view, such as a fisheye camera or a 360° camera, have been developed. Generally, a user manipulates directional keys, e.g., up, down, left, and right keys, provided in a monitoring device to pan or tilt an image capturing the monitored area. However, panning or tilting an image using such directional keys may take a long time, especially when a user wants to change a field of view drastically. Therefore, panning or tilting may not be performed rapidly enough to properly monitor an urgent event.

SUMMARY

It is an aspect of the present disclosure to provide a monitoring device and system capable of easily panning or tilting an image only with a simple manipulation.

It should be noted that objects of the present disclosure are not limited to the above-mentioned objects, and other objects of the present disclosure will be apparent to those skilled in the art from the following descriptions.

According to an aspect of an exemplary embodiment, there is provided a monitoring device including: a display configured to display an image acquired by a camera; and a processor configured to: control the display to display a panning control icon including an area corresponding to a panning range of the image, detect an input of selecting one point from the area of the panning control icon, determine a target panning direction based on a position of the selected one point on the panning control icon, perform panning on the image in the target panning direction, and display a direction marker at the position of the selected one point.

The panning control icon may include a portion of a ring shape.

The panning control icon may be a closed ring shape when a panning range of the image is 360°, and is a ring shape having an opening when a panning range of the image is less than 360°, wherein the opening represents an angle range in which panning is not available on the image.

The processor may be further configured to: detect a touch-and-hold input on an area surrounded by the portion of a ring shape, and control the display to display a window for setting color and transparency of the panning control icon in response to detecting the touch-and-hold input.

The panning control icon may further include at least one guideline which indicates a reference panning direction.

The processor may be further configured to: in response to detecting a flick input on the panning control icon, control the panning control icon to disappear in accordance with the flick input.

The processor may be further configured to: detect a pinch input in a vicinity of the panning control icon, and reduce a size of the panning control icon if the pinch input is a pinch-in input, and enlarge the size of the panning control icon if the pinch input is a pinch-out input.

The processor may be further configured to change a position of the panning control icon in response to detecting a drag-and-drop input on the panning control icon.

The processor may be further configured to: control the display to display a tilting control icon for controlling tilting of the image, wherein the tilting control icon includes a first icon displayed near the direction marker and a second icon displayed in an opposite direction about a center of the ring shape, in response to detecting an input of selecting the first icon, reduce a size of the first icon and enlarge a size of the second icon, and in response to detecting an input of selecting the second icon, enlarge a size of the first icon and reduce a size of the second icon.

The processor may be further configured to tilt the image downward in response to detecting an input of dragging the tilting control icon toward the first icon from the second icon, and tilt the image upward in response to detecting an input of dragging the tilting control icon toward the second icon from the first icon.

The monitoring device may further include a gyro sensor, wherein the processor is further configured to tilt the image based on a sensing value measured by the gyro sensor.

The processor may be further configured to: detect a drag input on an area surrounded by the ring shape, and tilt the image in accordance with a dragging direction of the drag input.

The processor may be further configured to: detect a tap input or a double-tap input from an area that is not adjacent to the panning control icon, and zoom in on the image in response to detecting the tap input, and zoom out on the image in response to detecting the double-tap input.

According to another aspect of an exemplary embodiment, there is provided a monitoring method performed by a monitoring apparatus, the method including: displaying an image acquired by a camera on a display of the monitoring apparatus; displaying a panning control icon including an area corresponding to a panning range of the image on the display; detecting an input of selecting one point from the area of the panning control icon; determining a target panning direction based on a position of the selected one point on the panning control icon; panning the image in the target panning direction; and displaying a direction marker at the position of the selected one point.

The displaying of the panning control icon on the display may include: displaying a starting icon on a boundary area of the image; detecting a drag-and-drop input on the starting icon; and displaying the panning control icon on a point at which the starting icon is dropped according to the drag-and-drop input.

The panning control icon may include a portion of a ring shape, the panning control icon is a closed ring shape when a panning range of the image is 360°, and is a ring shape having an opening when a panning range of the image is less than 360°, and the opening represents an angle range in which panning is not available on the image.

The monitoring method may further include: displaying a tilting control icon for controlling tilting of an image, wherein the tilting control icon may include a first icon displayed near the direction marker and a second icon displayed in an opposite direction about a center of the ring shape; tilting the image downward when an input of selecting a first icon of the tilting control icon is detected; and tilting the image upward when an input of selecting a second icon of the tilting control icon is detected.

According to another aspect of an exemplary embodiment, there is provided a monitoring system including: a camera configured to acquire an image; and a monitoring device configured to display the image acquired by the camera, wherein the monitoring device may include: a transceiver configured to receive the image from the camera; a memory configured to store the image; a display configured to display the image; and a processor configured to: control the display to display a panning control icon including an area corresponding to a panning range of the image, detect an input of selecting one point from the area of the panning control icon, determine a target panning direction based on a position of the selected one point on the panning control icon, perform panning on the image in the target panning direction, and display a direction marker at the position of the selected one point.

The panning control icon may include a portion of a ring shape, the panning control icon is a closed ring shape when a panning range of the image is 360°, and is a ring shape having an opening when a panning range of the image is less than 360°, and the opening represents an angle range in which panning is not available on the image.

The processor may be further configured to: control the display to display a tilting control icon for controlling tilting of the image, wherein the tilting control icon may include a first icon displayed near the direction marker and a second icon displayed in an opposite direction about a center of the ring shape, tilt the image downward when an input of selecting the first icon is detected, and tilt the image upward when an input of selecting the second icon is detected.

According to the exemplary embodiments, a user may rapidly pan a displayed image corresponding to the specific area using a panning control icon.

Further, a user can intuitively recognize a direction in which a specific area corresponding to a displayed image is disposed with respect to a camera.

It should be noted that effects of the present disclosure are not limited to the above-described effects, and various other effects of the present disclosure are included herein.

DETAILED DESCRIPTION OF EXEMPLARY EMBODIMENTS

Figure 1:
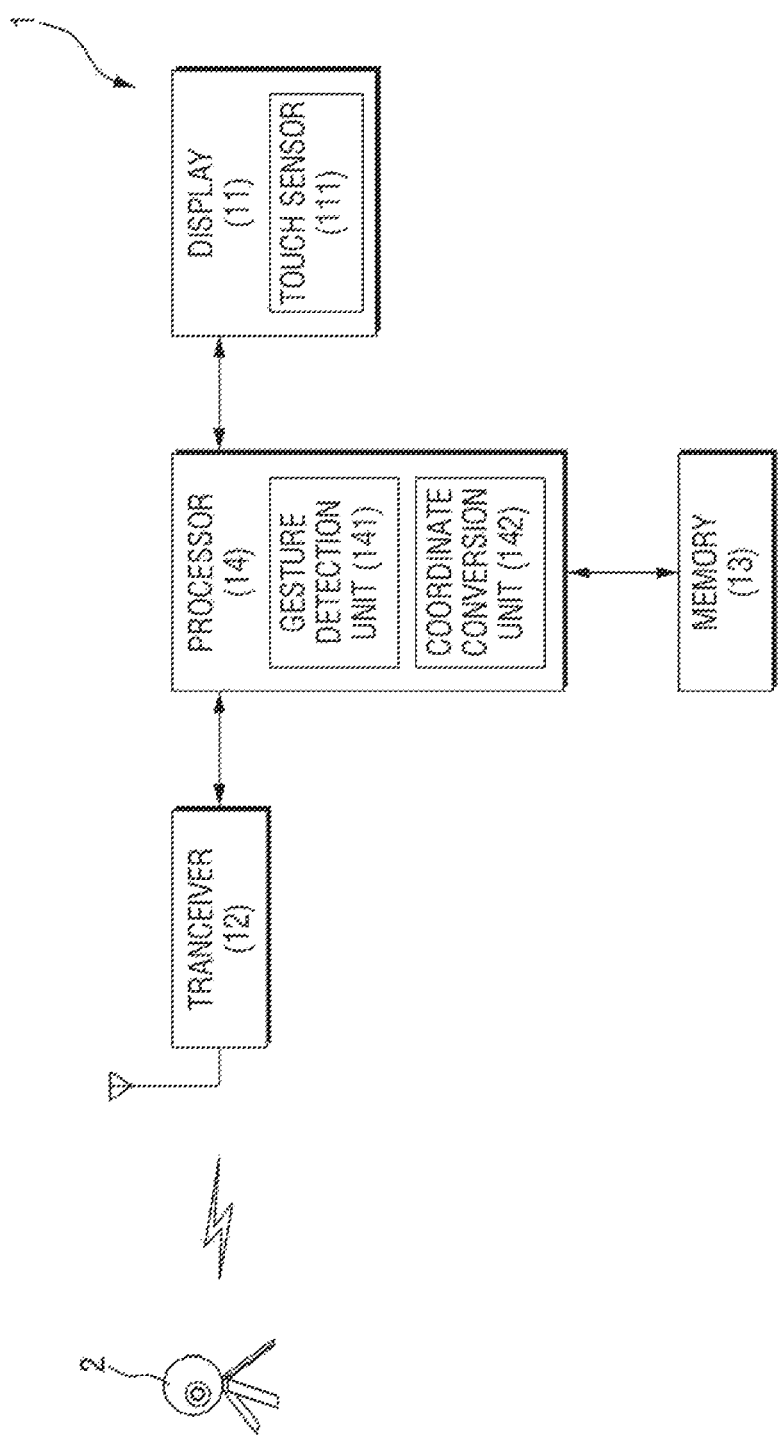
FIG. 1 is a block diagram of a monitoring system according to an exemplary embodiment.

Advantages and features of the present disclosure, and methods of achieving the same will become apparent when referring to exemplary embodiments which are described in detail below with reference to the accompanying drawings. However, the present disclosure is not limited to the exemplary embodiments disclosed herein and may be implemented in various other forms. The exemplary embodiments herein are merely provided to make the inventive concept of the present disclosure complete and inform those of ordinary skill in the art to which the present disclosure pertains of the scope of the inventive concept. The present disclosure is defined only by the scope of the claims below. Like elements are denoted by like reference numerals throughout.

Unless defined otherwise, all terms (including technical and scientific terms) used herein may have the same meanings commonly understandable to those skilled in the art to which the present disclosure pertains. Terms, such as those defined in commonly used dictionaries, are not to be construed in an idealized or overly formal sense unless expressly so defined herein.

Terms used herein are for describing the exemplary embodiments and are not intended to limit the inventive concept of the present disclosure. In the specification, a singular expression includes a plural expression unless the context clearly indicates otherwise. "Comprises" and/or "comprising" used herein do not preclude the existence or the possibility of adding one or more elements other than those mentioned.

Hereinafter, the exemplary embodiments will be described in detail with reference to the accompanying drawings.

Figure 2:
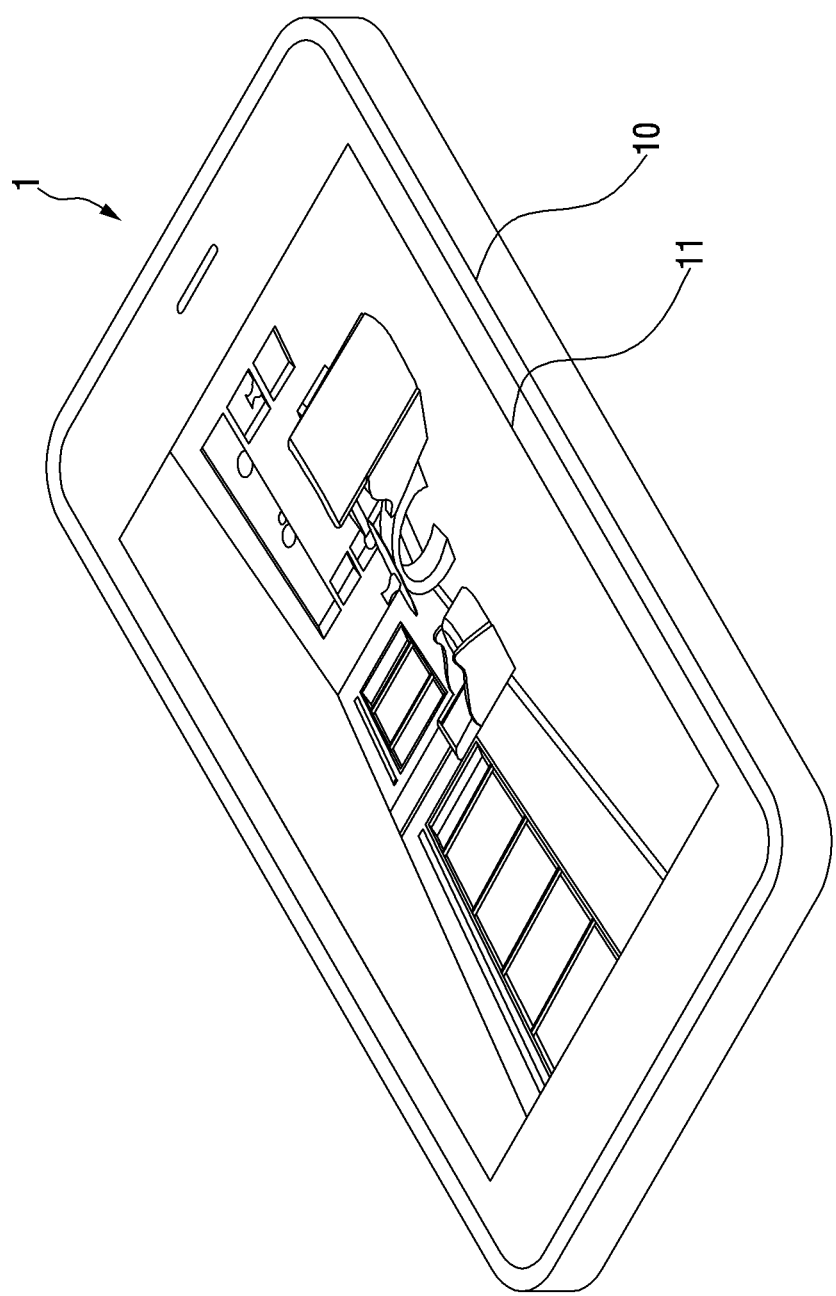
FIG. 2 is a perspective view of a monitoring device according to an exemplary embodiment.

FIG. 1 is a block diagram illustrating a configuration of a monitoring system according to an exemplary embodiment, and FIG. 2 is a perspective view of a monitoring device 1 of FIG. 1.

A panning control icon 23, which will be described in more detail with reference to FIGS. 7-36, may be displayed on a display 11 of the monitoring device 1. A user may pan an image displayed on the display 11 using the panning control icon 23. The panning control icon 23 may be configured so that a user can easily pan an image.

A monitoring system according to an exemplary embodiment may include a camera 2 which captures a specific area for monitoring and acquire an image of the area, and the monitoring device 1 may receive and display the image. The camera 2 and the monitoring device 1 may be connected to each other through wired or wireless connection for communication.

The camera 2 may be a pan-tilt camera capable of panning and tilting. For example, the camera 2 may pan 360° to capture objects in any direction. Alternatively, the camera 2 may be a 360°-camera that has been recently introduced. The 360°-camera refers to a camera on which a plurality of fisheye lenses are mounted such that the camera may capture objects in every direction without panning or tilting. In this case, an image acquired by the 360°-camera may be panned or tilted by software installed in the monitoring device 1. The camera 2 according to an exemplary embodiment is not limited thereto, and various other cameras may be used as the camera 2 as long as the cameras are capable of capturing a plurality of areas.

The monitoring device 1 according to an exemplary embodiment may receive an image acquired by the camera 2 and displays the image. The monitoring device 1 may be controlled by a touch input, but is not limited thereto. Any other device which receives a user command by another input means, such as a mouse, may be used to implement the monitoring device 1. Hereinafter, the monitoring device 1 will be assumed to be touch sensitive (i.e., provide a touch function of recognizing a touch input). However, this assumption is only for convenience of description and is not intended to limit the scope of the monitoring device 1.

A user may install or uninstall various applications on the monitoring device 1. Among various applications, the user may run a camera control application and generate a signal for controlling panning or tilting of an image by touch, mouse, or the like. If the camera 2 may physically pan or tilt, the control signal may be transmitted to the camera 2. However, if the camera 2 is a 360°-camera, the control signal may pan or tilt an image by software installed in the monitoring device 1.

As illustrated in FIGS. 1 and 2, the monitoring device 1 may include a main body 10, a display 11 configured to display an image, a transceiver 12 configured to receive an image from the camera 2, a memory 13 configured to store the image, and a processor 14 configured to control other elements.

The display 11 displays an image transmitted from the camera 2. When the monitoring device 1 provides a touch function, the display 11 may include a touch sensor 111. In such a case, the user may directly input a touch signal through the display 11. The touch sensor 111 may be integrally mounted with the display 11 to sense a touch generated on the display 11, detect coordinates of an area in which the touch is generated, the number of times and strengths of touches, or the like, and transmit the detected result to the processor 14. Various types such as a capacitive type, an electrical resistive type, an ultrasonic type, and an infrared type may be used in accordance with a method in which the touch sensor 111 senses a touch. Even when the monitoring device 1 provides a touch function, a separate touch pad may be provided as an input unit if the display 11 does not include the touch sensor 111. The touch may be made using a finger, but exemplary embodiments are not limited thereto. For example, the touch may also be made using a stylus pen or the like on which a tip capable of flowing micro-currents is mounted. When the monitoring device 1 does not provide a touch function, an input unit through which a user command may be input, such as a mouse, may be separately provided.

The transceiver 12 may transmit and receives signals and/or data to and from the camera 2 through wired and/or wireless communications. For example, the transceiver 12 may perform modulation and/or frequency-up conversion on signals and data from the processor 14 for transmission to the camera 2. Also, the transceiver 12 may perform demodulation and/or frequency down-conversion on signals and data received from the camera 2, and provide the resultant signals and data to the processor 14.

The memory 13 may store programs for processing and controlling operations of the monitoring device 1, various data generated while each of the programs is running, an original image received from the camera 2, and a revised image formed by editing the original image. Although the memory 13 may be built in the monitoring device 1, a separate device such as a network video recorder (NVR) may also be provided in case the camera 2 is a network camera.

The processor 14 controls overall operations of the monitoring device 1. For example, the processor 14 control communications between the transceiver 12 and the camera 2. For example, for transmission of an image to the camera 2, the processor 14 may perform decoding, rendering, and the like with respect to the image. Based on a user command is input, the processor 14 may control the display 11 to display the panning control icon 23 (which will be described later with reference to FIGS. 7-36), store an image in the memory 13, and control the stored image to be loaded. Examples of the processor 14 include, but are not limited to, a central processing unit (CPU), a micro controller unit (MCU), and a digital signal processor (DSP) Various other logic operation processors may be used as the processor 14.

The processor 14 may include a gesture detection unit 141 and a coordinate conversion unit 142. The gesture detection unit 141 may detect a touch gesture from the touch sensor 111. The touch gesture includes various touch operations generated from the touch sensor 111. When the monitoring device 1 does not provide a touch function, the processor 14 may detect a user command through an input unit such as a mouse. The gesture detection unit 141 manages the touch sensor 111 and uses an application program interface (API) to facilitate the use of touch gesture in an application. The API refers to an interface for controlling functions provided by an operating system (OS) or programming language for the functions to be used in an application program. The gesture detection unit 141 receives a user command for executing the camera control application and receives a user command for controlling an activated application through the API.

The coordinate conversion unit 142 receives coordinates at which a user command is input from the gesture detection unit 141, and generates a value representing a degree of panning or tilting of an image on the basis of the received coordinates. When a user makes a touch at one point on the display 11 to manipulate the panning control icon 23 (which will be described later with reference to FIGS. 7-36), coordinates of the point are extracted. When the user performs dragging on the display 11, coordinates of a drag path are extracted at predetermined periods or intervals. The coordinate conversion unit 142 may recognize a direction and distance of the dragging from the extracted coordinates, and converts the recognized direction and distance into a value indicating an extent to which an image should be panned or tilted, and/or a value indicating an extent to which the panning control icon 23 should be changed. Therefore, based on the value, the image may pan or tilt, or the panning control icon 23 may be changed, in accordance with a drag command from the user.

Figure 3:
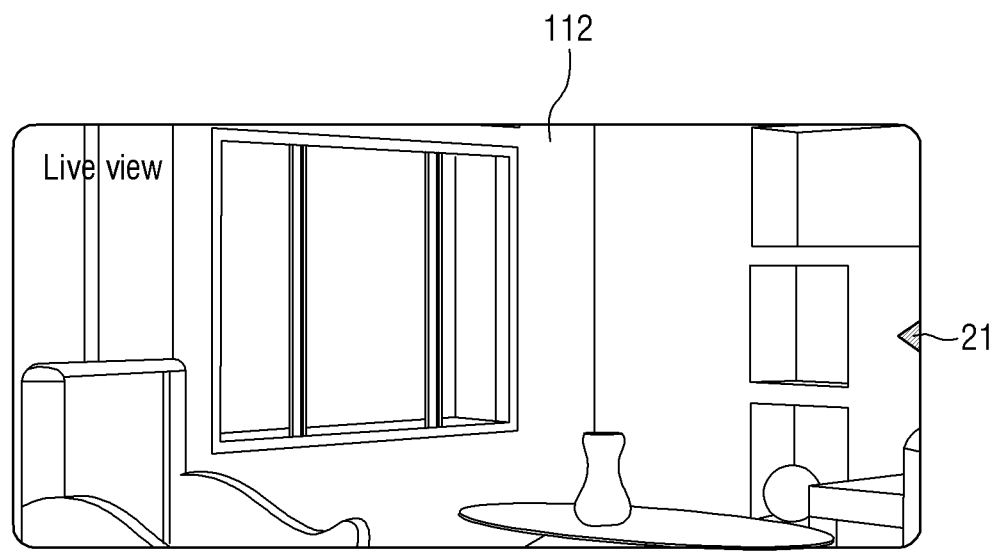
FIG. 3 is a view illustrating a starting icon according to an exemplary embodiment.

FIG. 3 is a view illustrating a state in which a starting icon 21 is displayed on the display 11 of the monitoring device 1 according to an exemplary embodiment.

When the monitoring device 1 is started, first, a live view 112 is displayed with the starting icon 21 on the display 11. In this example, the starting icon 21 is displayed on the right edge of the display 11. Preferably, the size of the starting icon 21 may be small so as not to interfere with a user monitoring an image such as the live view 112. The starting icon 21 may have a triangular shape as illustrated in FIG. 3, but is not limited thereto, and may have various other shapes such as a semicircular shape and a quadrilateral shape.

Figure 4:
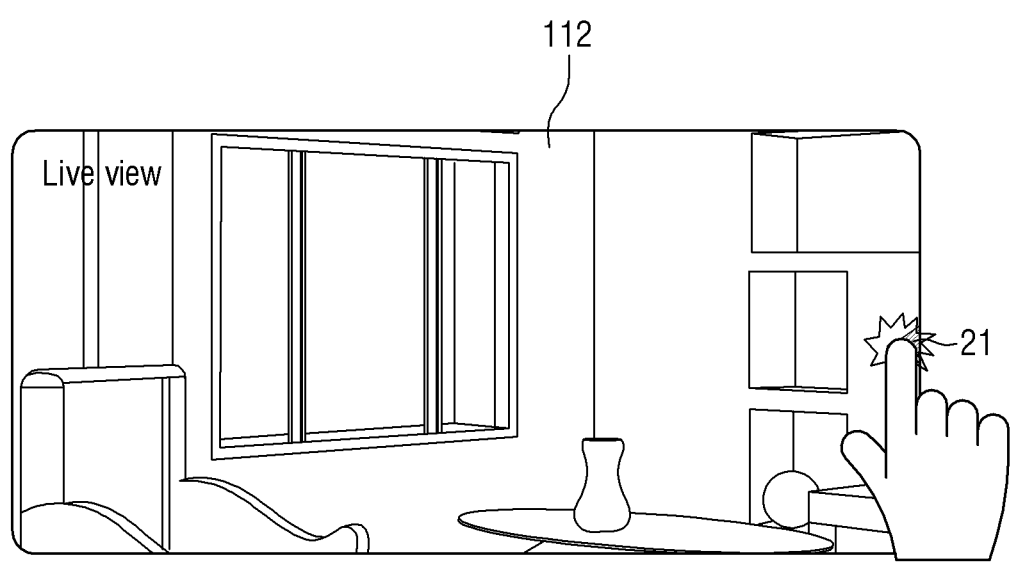
FIG. 4 is a view illustrating a user input of tapping a starting icon according to an exemplary embodiment.
Figure 5:
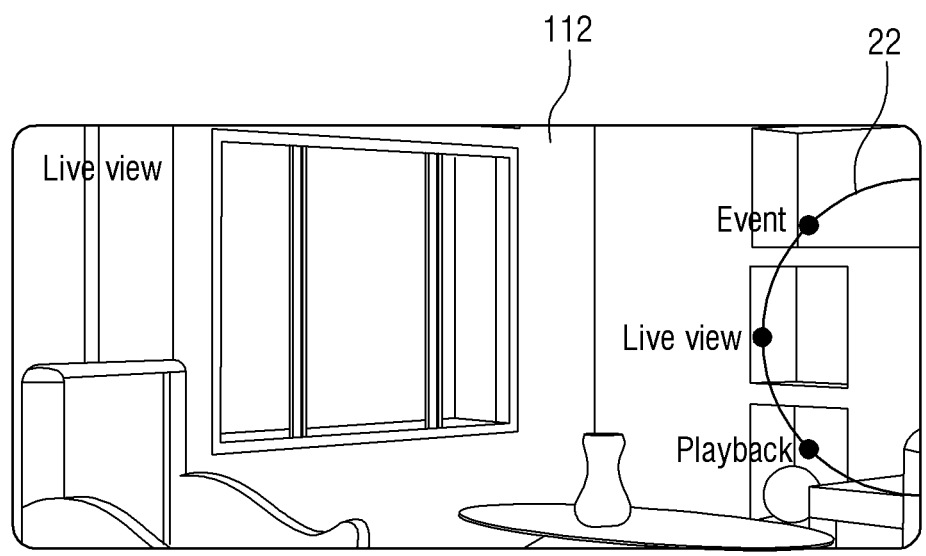
FIG. 5 is a view illustrating a menu wheel icon according to an exemplary embodiment.

FIG. 4 is a view illustrating a state in which the starting icon 21 displayed in FIG. 3 is tapped, and FIG. 5 is a view illustrating a state in which, as a result of tapping in FIG. 4, a menu wheel icon 22 is displayed on the monitoring device 1.

Tapping is one of touch gestures and refers to making a short touch on the display 11 and then immediately releasing the touch. Generally, duration of time in which a touch is maintained is less than one second. When tapping is repeatedly performed within a short time, tapping two times is referred to as double-tapping, and tapping three times is referred to as triple-tapping.

When a user taps the starting icon 21, the menu wheel icon 22 is displayed at a position at which the starting icon 21 was displayed. In this example, like the starting icon 21, the menu wheel icon 22 is displayed on the right edge of the display 11 of the monitoring device 1. The starting icon 21 may disappear as the menu wheel icon 22 is displayed. If the user's command is input to the monitoring device 1 using a mouse, the menu wheel icon 22 may be displayed when the starting icon 21 is clicked.

As shown in FIG. 5, the menu wheel icon 22 may be formed using dots and lines so as not to interfere with the user monitoring the displayed image. The menu wheel icon 22 may have a semicircular shape as illustrated in FIG. 5, but is not limited thereto, and may have various other shapes such as a triangular shape and a quadrilateral shape.

Various selectable items may be displayed on the menu wheel icon 22, such as the live view 112, event, playback, setting, etc. As illustrated in FIG. 5, each of the selectable items is expressed by a dot forming a selectable area for user's selection and text indicating the name of the corresponding item. An item on the menu wheel 22 may be selected when the user taps or clicks the item. When the user drags the menu wheel icon 22 upward or downward, the menu wheel icon 22 may be rotated in the direction of dragging, and a position of each of the items may be changed.

The live view 112 refers to an image of an area that is currently being captured for monitoring by the camera 2 and displayed on the monitoring device 1 in real time. The playback refers to an image that is already captured and stored in the storage unit 13. Such an image may be loaded from the monitoring device 1, and then displayed according to user's selection of the "playback" item on the menu wheel 22. The event refers to recorded data of a specific event when the event has occurred. For example, when a specific movement is detected in a house, a position and time of the movement is automatically recorded and formed into data. The setting refers to a menu that allows the user to change various options in a desired way. The selectable items displayed on the menu wheel icon 22 are not limited thereto, and various other types of items may be provided.

Figure 6:
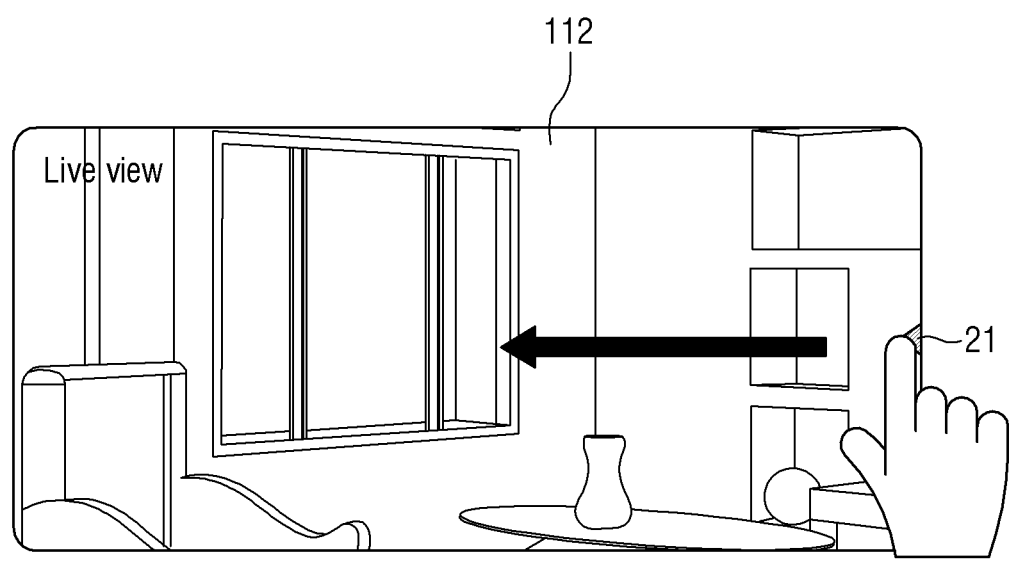
FIG. 6 is a view illustrating a user input of dragging a starting icon according to an exemplary embodiment.
Figure 7:
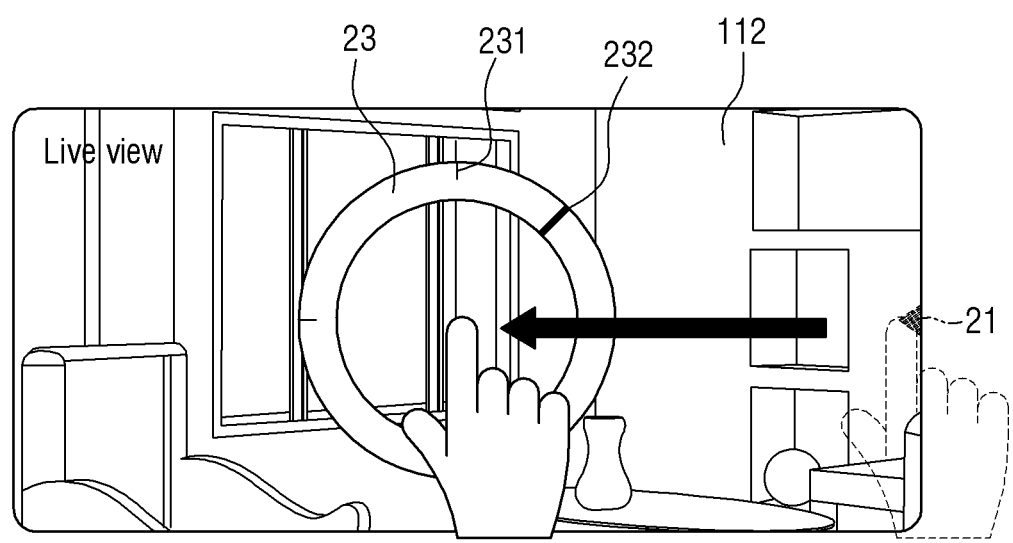
FIG. 7 is a view illustrating a panning control icon according to an exemplary embodiment.

FIG. 6 is a view illustrating a state in which the starting icon 21 in FIG. 3 is dragged, and FIG. 7 is a view illustrating a state in which, as a result of dragging in FIG. 6, the panning control icon 23 is displayed on the monitoring device 1.

Dragging is one of touch gestures, and refers to moving a touch point from one position to another position maintaining a contact with the screen.

In the display 11 of the monitoring device 1, the live view or the playback may be displayed in accordance with user's selection from the menu wheel icon 22. In this case, to perform dragging, the user touches and holds the starting icon 21. As illustrated in FIG. 6, the user draws the starting icon 21 from the right edge of the display 11 to approximately a central portion of the display 11. Then, as illustrated in FIG. 7, the starting icon 21 is changed into the panning control icon 23 and dragged. In this case, to draw the starting icon 21, the user has to maintain the touch on the starting icon 21. In other words, the user may release the maintained touch after the starting icon 21 is drawn to a desired point. When the touch is released, the panning control icon 23, which was being dragged, is fixed at a point at which the touch is released. Alternatively, the user may perform such a dragging gesture using a mouse.

The panning control icon 23 may have a ring shape as illustrated in FIG. 7, but is not limited thereto, and may have various other shapes. Hereinafter, the panning control icon 23 will be described as having a ring shape. However, this is for convenience of description and is not intended to limit the scope. The panning control icon 23 has guidelines 231 marked at the top, the bottom, the left, and the right with respect to the display 11. The guidelines 231 respectively correspond to the front, rear, left, and right directions of the camera 2. A direction line 232 is also marked in the panning control icon 23. The direction line 232 indicates a panning direction of a currently-displayed image. The guidelines 231 and the direction line 232 will be described in detail below.

Figure 8:
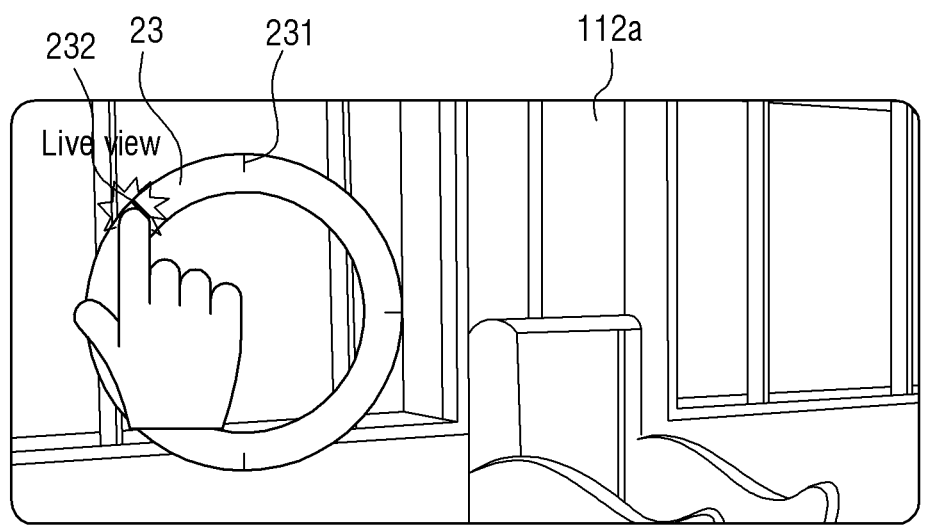
FIG. 8 is a view illustrating a user input of tapping on a panning control icon according to an exemplary embodiment.
Figure 9:
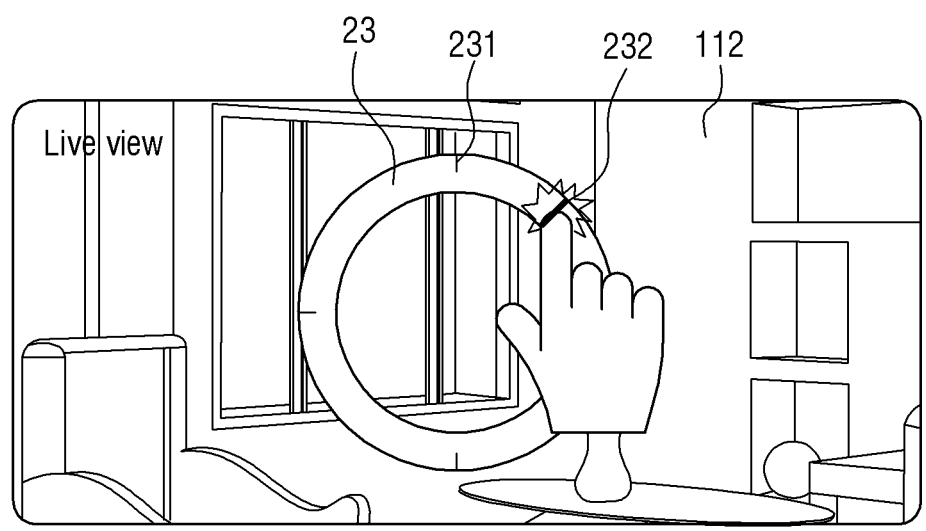
FIG. 9 is a view illustrating a user input of tapping a panning control icon according to an exemplary embodiment.

FIG. 8 is a view illustrating a state in which a point on the panning control icon 23 is tapped according to an exemplary embodiment, and FIG. 9 is a view illustrating a state in which another point on the panning control icon 23 is tapped according to an exemplary embodiment.

On the display 11 of the monitoring device 1, the live view 112 may be displayed in accordance with user's selection from the menu wheel icon 22. The panning control icon 23 is displayed over the live view 112. A ring-shaped area of the panning control icon 23 may correspond to a panning range of the live view 112. When a specific point is selected from the ring-shaped area, the image may be immediately panned in a direction corresponding to the specific point.

Specifically, the guidelines 231 and the direction line 232 are marked in the ring-shaped area of the panning control icon 23. The guidelines 231 may respectively correspond to the front, rear, left, and right directions of the camera 2. That is, a top guideline 231 of the panning control icon 23 corresponds to the front view of the camera 2, a bottom guideline 231 corresponds to the rear view of the camera 2, a left guideline 231 corresponds to the left view of the camera 2, and a right guideline 231 corresponds to the right view of the camera 2. Therefore, when an image is panned, and the direction line 232 indicates a direction the camera 2 is currently facing, the guidelines 231 indicate a reference to a specific direction of the panning direction indicated by the direction line 232 with respect to the camera 2.

The direction line 232 indicates a panning direction of the live view 112. When the user taps or clicks a point on the panning control icon 23, as illustrated in FIG. 8, the direction line 232 is moved to the point on the panning control icon 23. Also, and a live view 112a is panned to correspond to the movement of the direction line 232. When the user taps or clicks another point on the panning control icon 23, as illustrated in FIG. 9, the direction line 232 moves to the other point on the panning control icon 23, and the live view 112 is panned to correspond to the movement of the direction line 232.

When the camera 2 is a 360°-camera, images of areas in all directions are acquired and stored. Therefore, an image may be easily panned by the above method using the panning control icon 23 even in the case of a playback image as well as the live view 112.

Figure 10:
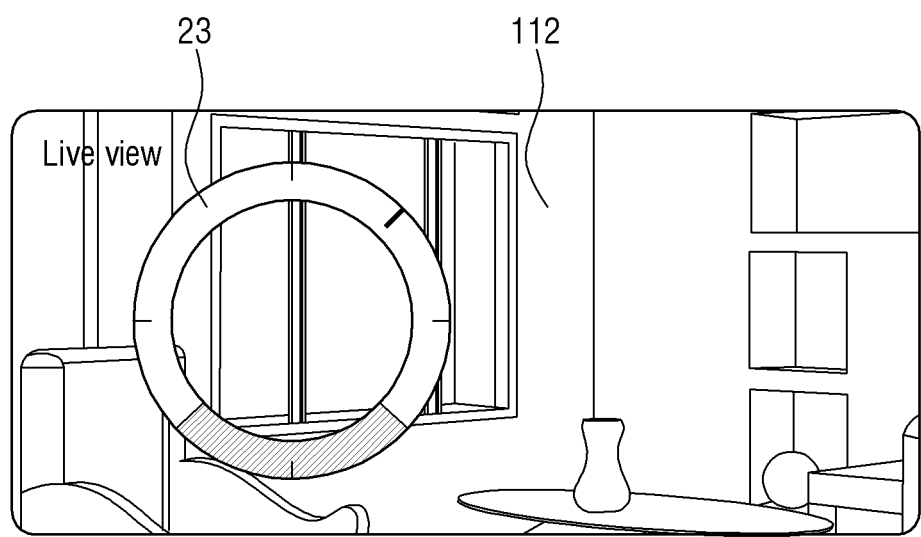
FIG. 10 is a view illustrating a panning control icon according to an exemplary embodiment.

FIG. 10 is a view illustrating the panning control icon 23 formed when the panning range of the camera 2 is limited.

As described above, if the camera 2 is capable of panning 360°, the camera 2 maybe capable of capturing in all of front, rear, left, and right directions. However, the panning range of an image may be limited to a specific angle depending on the types and functions of the camera 2. In such a case, a user needs to know the panning-possible range of an image in advance.

Therefore, when the panning-possible range of an image is limited to a specific angle, as illustrated in FIG. 10, an area corresponding to a panning-impossible range may be displayed in different color from that of an area corresponding to a panning-possible range in the panning control icon 23. Particularly, the area corresponding to the panning-impossible range may be displayed in grayish color such as black or gray to allow the user to recognize that panning is impossible in that area. Alternatively, an area corresponding to a panning-impossible range may not be displayed at all, and only an area corresponding to a panning-possible range may be displayed. That is, various methods may be used as long as a user may recognize a panning-possible range and a panning-impossible range from the panning control icon 23.

Figure 11:
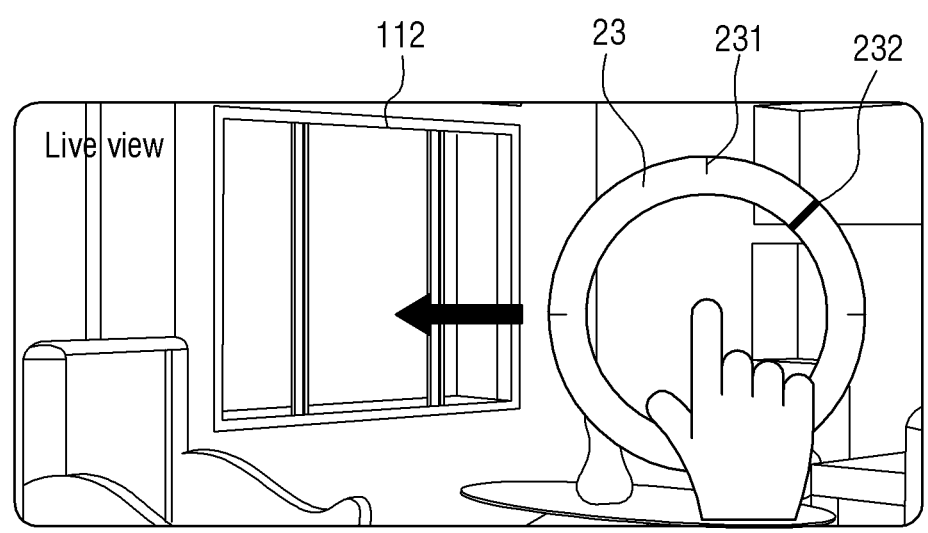
FIG. 11 is a view illustrating a user input of dragging and dropping a panning control icon according to an exemplary embodiment.
Figure 12:
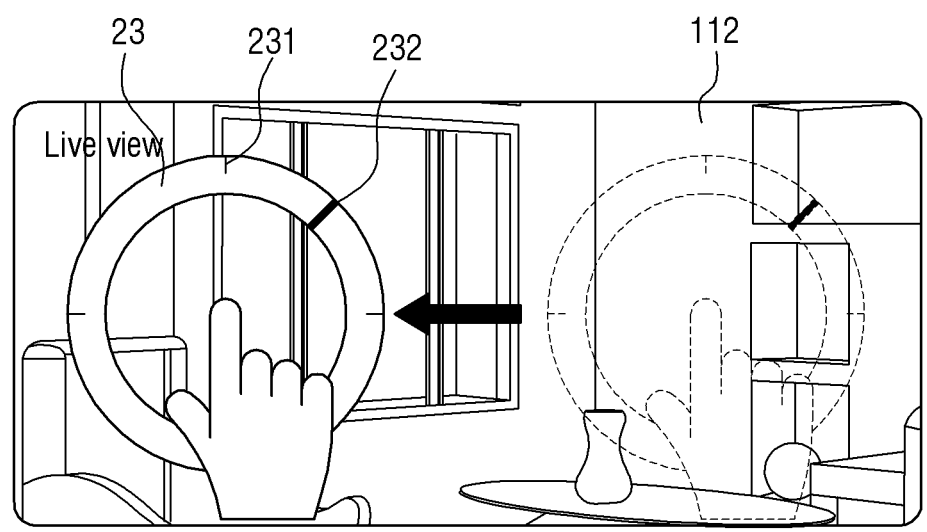
FIG. 12 is a view illustrating a movement of a panning control icon according to an exemplary embodiment.

FIG. 11 is a view illustrating a state in which the panning control icon 23 is dragged and dropped according to an exemplary embodiment, and FIG. 12 is a view illustrating a state in which, as a result of dragging and dropping in FIG. 11, the panning control icon 23 is moved.

As described above, when the user taps or clicks one point in the ring-shaped area of the panning control icon 23, an image is panned. However, for the user to drag the panning control icon 23, as illustrated in FIG. 11, the user may touch and hold an approximately central area, i.e., an area surrounded by the ring-shaped area, of the panning control icon 23. Here, holding refers to maintaining a touch for a predetermined amount of time before dragging is performed. The predetermined amount of time may be about 0.5 second to one second, but is not limited thereto. Then, the panning control icon 23 may be drawn from one point to another point by dragging the touch. Alternatively, the user may move the panning control icon 23 by a normal dragging gesture (i.e., without maintaining the touch for a predetermined amount of time before dragging)

FIG. 12 shows that the panning control icon 23 is dragged from the one point to the other point. In this case, to draw the panning control icon 23, the user has to continuously maintain the touch until the panning control icon 23 is drawn and moved to a desired point. When the touch is released, the panning control icon 23, which was being dragged, is fixed at a point at which the touch is released. When the user may input a command to the monitoring device 1 using a mouse, the panning control icon 23 may be dragged from one point to another point when the panning control icon 23 is dragged using a mouse.

Figure 13:
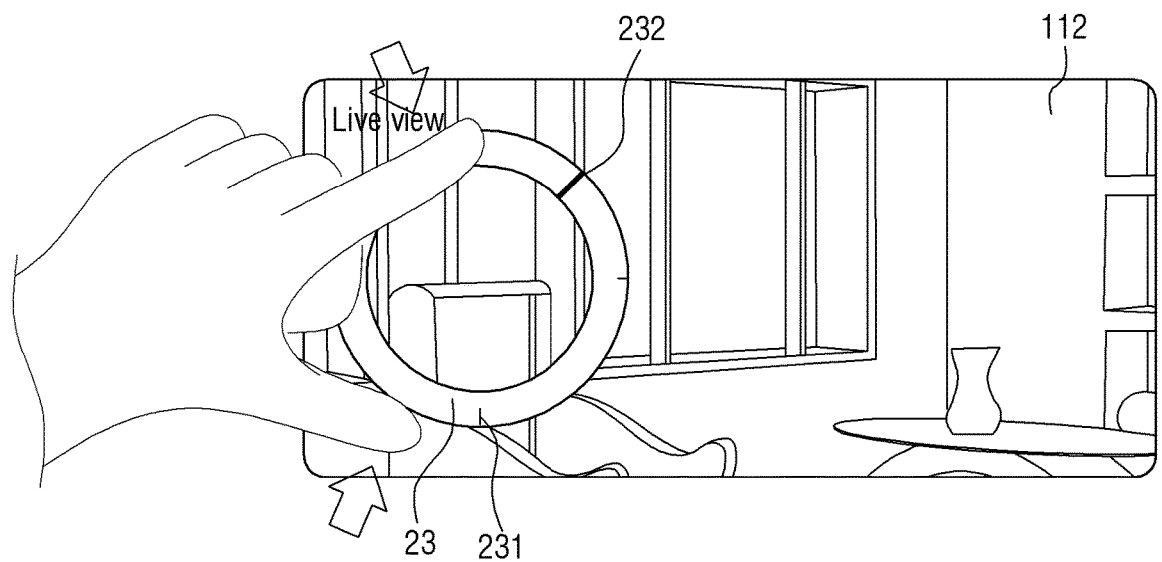
FIG. 13 is a view illustrating a user input of pinching in a panning control icon according to an exemplary embodiment.
Figure 14:
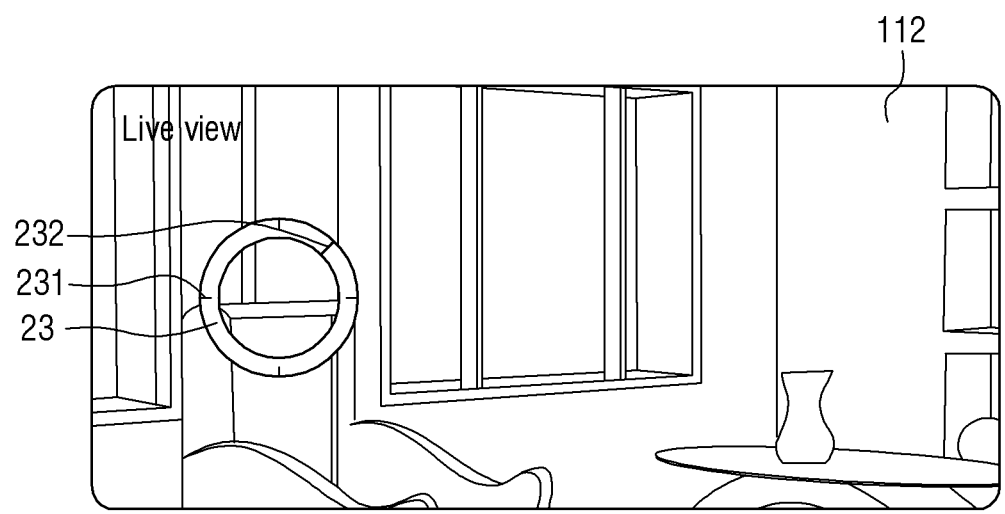
FIG. 14 is a view illustrating a panning control icon shrinking based on a user input, according to an exemplary embodiment.

FIG. 13 is a view illustrating a state in which the panning control icon 23 is pinched in according to an exemplary embodiment, and FIG. 14 is a view illustrating a state in which, as a result of pinching in in FIG. 13, the size of the panning control icon 23 is reduced.

Figure 15:
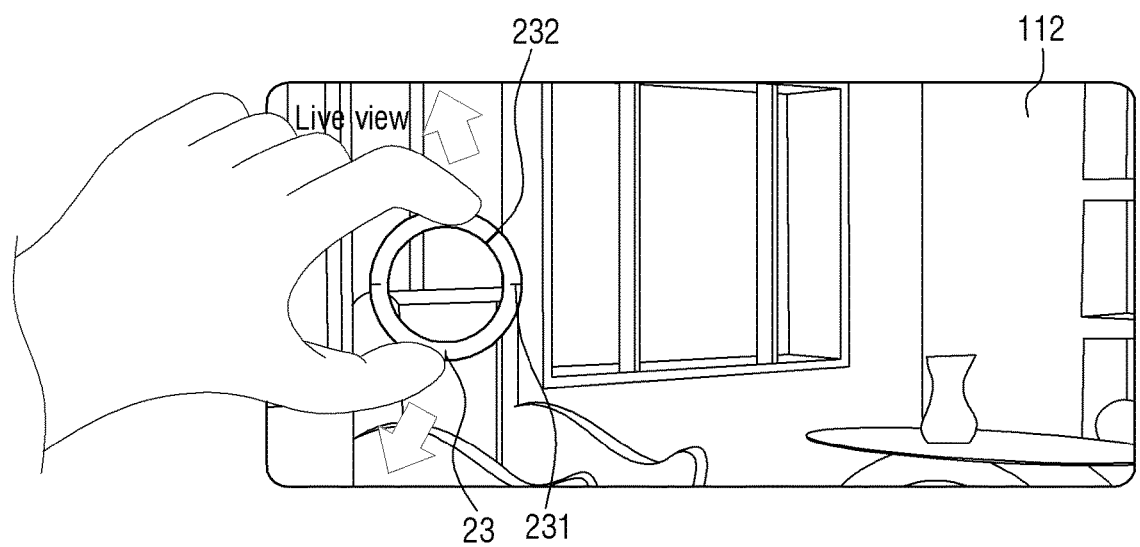
FIG. 15 is a view illustrating a user input of pinching out a panning control icon according to an exemplary embodiment.
Figure 16:
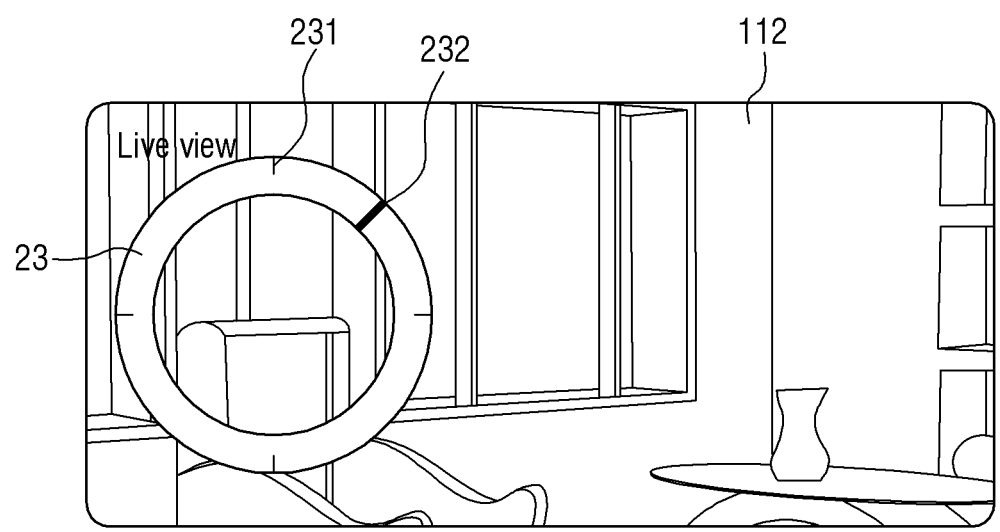
FIG. 16 is a view illustrating a panning control icon that is enlarged in response to a user input, according to an exemplary embodiment.

FIG. 15 is a view illustrating a state in which the panning control icon 23 is pinched out according to an exemplary embodiment, and FIG. 16 is a view illustrating a state in which, as a result of pinching out in FIG. 15, the size of the panning control icon 23 is enlarged.

A user may perform pinching in to enlarge the panning control icon 23. Here, pinching is one of touch gestures, and refers to sliding two fingers while touches on the display 11 made by the two fingers are maintained. Generally, pinching is used to adjust a scale of a screen displayed on the display 11. Sliding two fingers such that the fingers approach each other refers to pinching-in or pinching close, and in this case, an image may shrink. Conversely, sliding two fingers such that the fingers recede from each other refers to pinching-out or pinching-open, and in this case, an image may be enlarged.

When a user touches the ring-shaped area of the panning control icon 23 with two fingers and performs pinching-in as illustrated in FIG. 13, the size of the panning control icon 23 may be reduced as illustrated in FIG. 14. On the other hand, when the user touches the ring-shaped area of the panning control icon 23 with two fingers and performs pinching-out as illustrated in FIG. 15, the size of the panning control icon 23 is enlarged as illustrated in FIG. 16.

Figure 17:
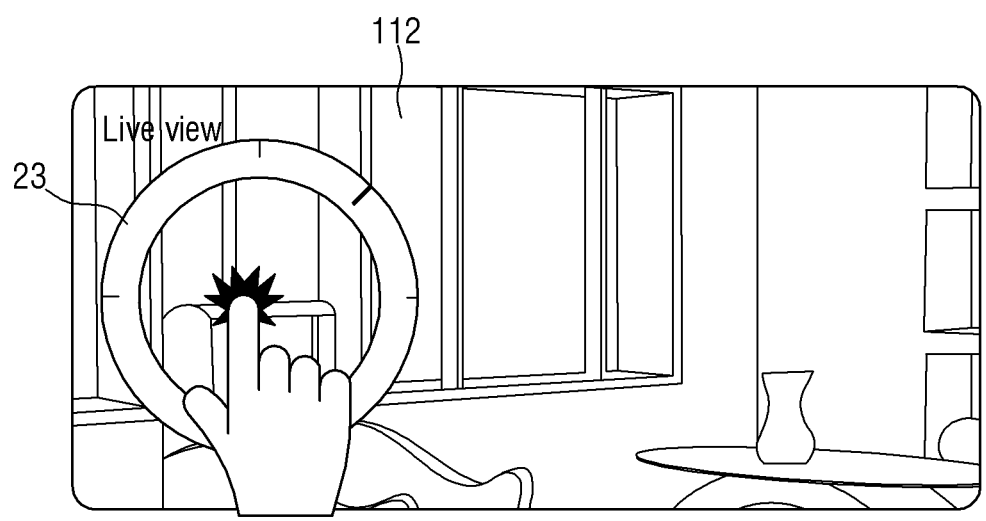
FIG. 17 is a view illustrating a user input of touching and holding a panning control icon, according to an exemplary embodiment.
Figure 18:
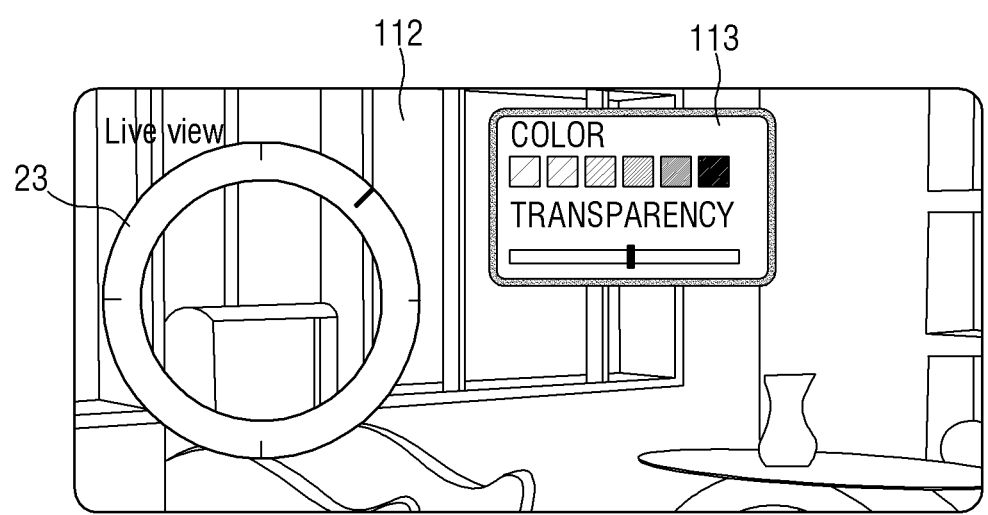
FIG. 18 is a view illustrating a color-and-transparency setting window according to an exemplary embodiment.

FIG. 17 is a view illustrating a state in which the panning control icon 23 is touched and held according to an exemplary embodiment, and FIG. 18 is a view illustrating a state in which, as a result of touching and holding in FIG. 17, a color-and-transparency setting window 113 is displayed.

As illustrated in FIG. 17, a user may touch and hold an approximately central area, i.e., an area surrounded by the ring-shaped area, of the panning control icon 23. In this case, when the user maintains the touch for a predetermined amount of time or more without performing sliding, the color-and-transparency setting window 113 may be displayed near the panning control icon 23 as illustrated in FIG. 18. The predetermined amount of time may be about one second to two seconds, but is not limited thereto.

Color and transparency of the panning control icon 23 may be set through the color-and-transparency setting window 113. The color may be changed in accordance with a user's taste to simply provide a visual esthetic sense to the user. However, the color may also be changed to distinguish the panning control icon 23 from a background of a displayed image. For example, when an image has a dark background overall, it is difficult for the user to distinguish the panning control icon 23 when the panning control icon 23 is in dark color. However, the user may easily distinguish the panning control icon 23 when color of the panning control icon 23 is changed to bright color. That is, in addition to performing an esthetic function, color may also perform a function of allowing the user to identify the panning control icon 23.

The panning control icon 23 may be displayed on an image and interfere with a user monitoring the image in some cases. Therefore, the transparency of the panning control icon 23 may be adjusted for the user to easily monitor the image.

When the user taps an area other than the setting window 113 after completing adjustment of color and transparency of the panning control icon 23, the setting window 113 may disappear.

Figure 19:
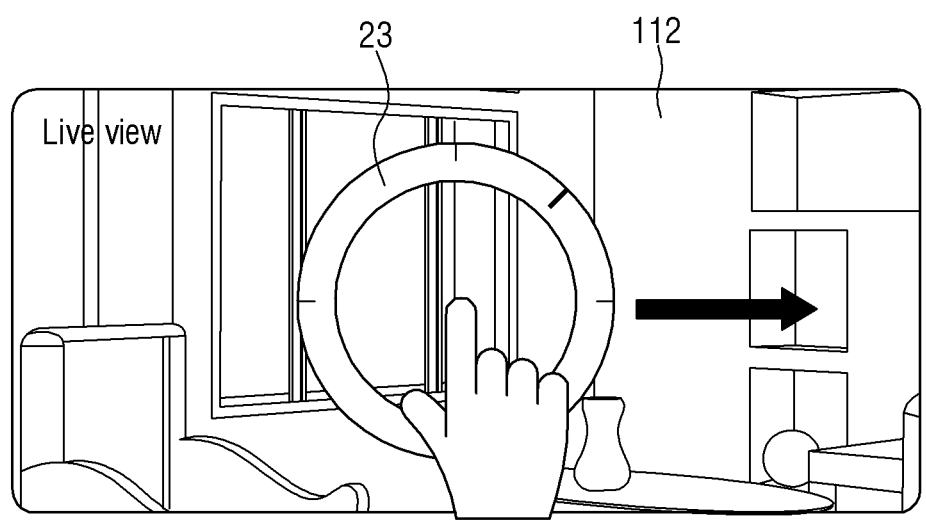
FIG. 19 is a view illustrating a user input of flicking a panning control icon in the right direction, according to an exemplary embodiment.
Figure 20:
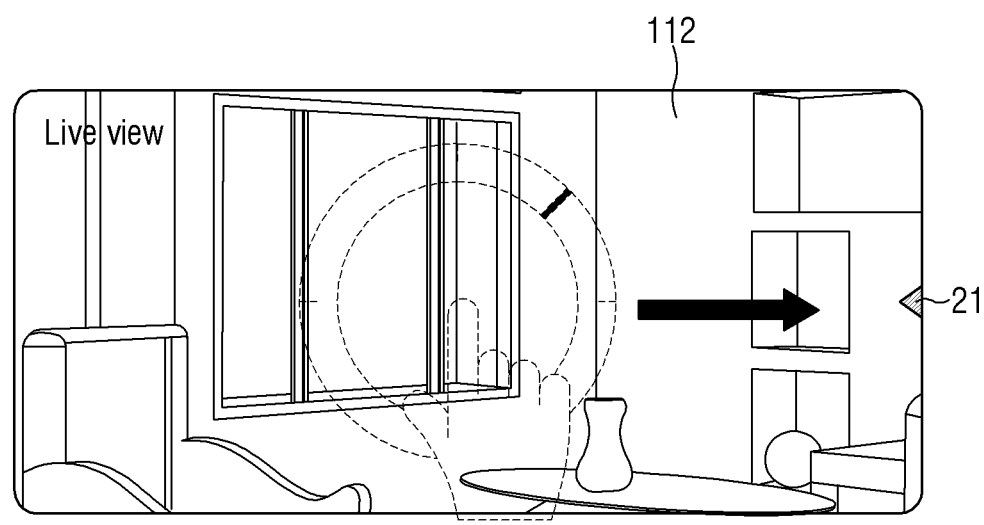
FIG. 20 is a view illustrating a monitoring device which displays a starting icon on the right edge in response to a user input of flicking a panning control icon to the right, according to an exemplary embodiment.

FIG. 19 is a view illustrating a state in which the panning control icon 23 is flicked toward one edge of the display 11 according to an exemplary embodiment, and FIG. 20 is a view illustrating a state in which, as a result of flicking in FIG. 19, the starting icon 21 is displayed on the edge of the display 11.

Flicking is one of touch gestures, and refers to rapidly sliding in one direction while maintaining a touch made by a finger on the display 11 and releasing the touch before sliding movement of the finger is stopped. Flicking is similar to dragging in that sliding is performed while a touch made by a finger is maintained. However, while a point at which the touch is released may be clearly detected in the case of dragging because the touch is released after sliding of the finger is stopped. By comparison, a point at which the touch is released is not clear in the case of flicking because the touch on the display 11 is gradually released before sliding of the finger is stopped.

As illustrated in FIG. 19, the user may touch and hold an approximately central area, i.e., an area surrounded by the ring-shaped area, of the panning control icon 23. Then, the user may flick the panning control icon 23 toward the right edge of the display 11. In this case, as illustrated in FIG. 3, the right edge of the display 11 is a position at which the starting icon 21 was initially displayed. After flicking is performed, as illustrated in FIG. 20, the panning control icon 23 may disappear after moving to the bottom of the display unit 11, and the starting icon 21 may be displayed again at a position at which the starting icon 21 was initially displayed.

Figure 21:
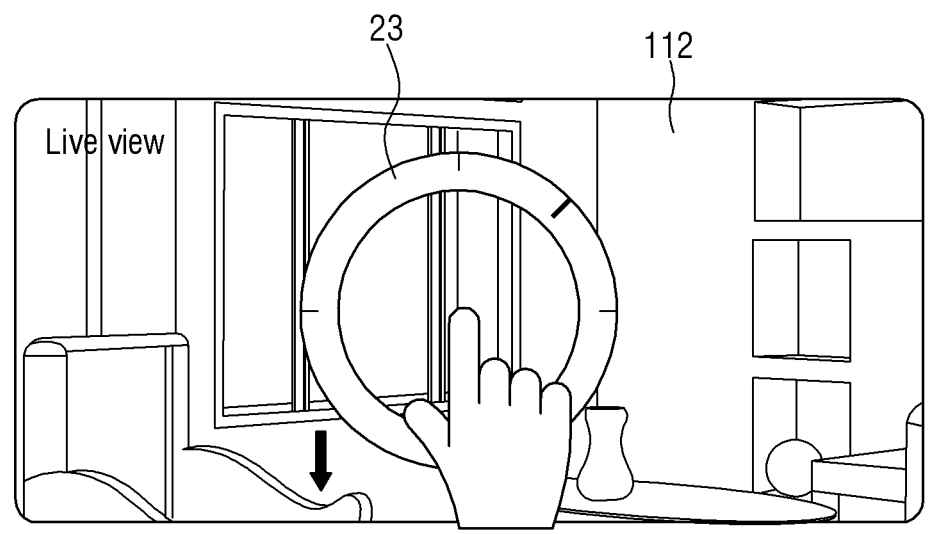
FIG. 21 is a view illustrating a user input of flicking a panning control icon downward, according to an exemplary embodiment.
Figure 22:
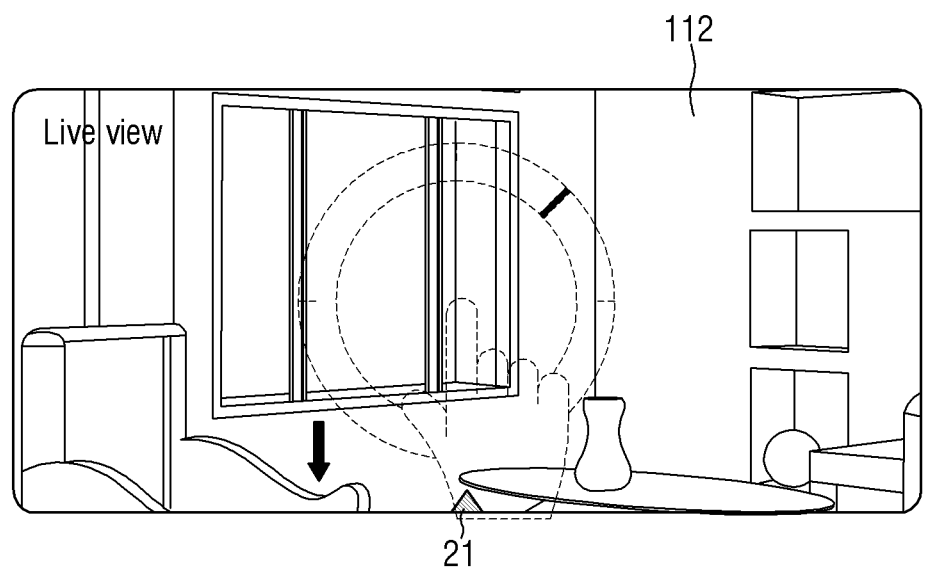
FIG. 22 is a screen of a monitoring device, which displays a starting icon on the bottom in response to a user input of flicking down a panning control icon, according to an exemplary embodiment.

FIG. 21 is a view illustrating a state in which the panning control icon 23 is flicked toward the bottom of the display 11 according to an exemplary embodiment, and FIG. 22 is a view illustrating a state in which, as a result of flicking in FIG. 21, the starting icon 21 is displayed at the bottom of the display 11.

A user may perform flicking toward any other directions regardless of the position at which the starting icon 21 was initially displayed. As illustrated in FIG. 21, the user may also flick the panning control icon 23 toward the bottom of the display 11. Then, as illustrated in FIG. 22, the panning control icon 23 may disappear after moving to the bottom of the display 11, and the starting icon 21 may be displayed at the bottom.

In FIGS. 19 to 22, flicking the panning control icon 23 toward one edge of the display 11 is illustrated. However, according to an exemplary embodiment, the user may flick the panning control icon 23 in any other directions. After flicking is performed, the panning control icon 23 may disappear after moving to an edge corresponding to a direction in which flicking is performed. Then, the starting icon 21 is displayed at the corresponding position.

Figure 23:
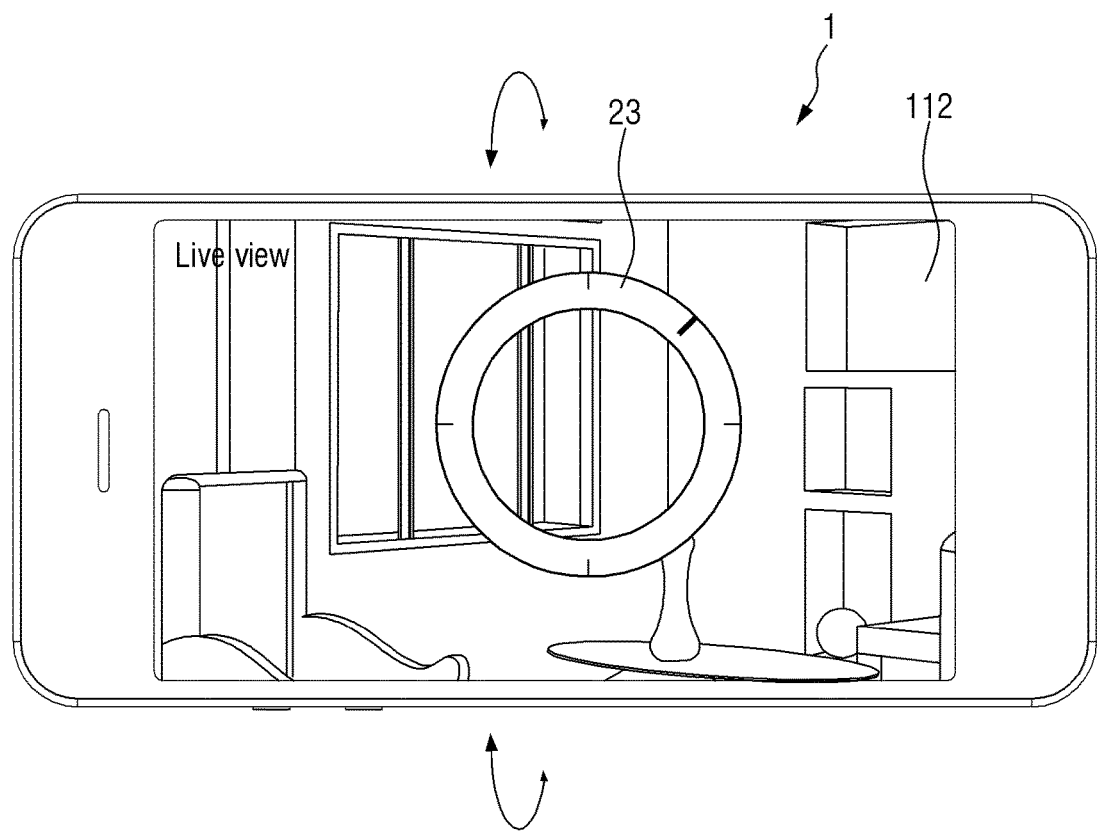
FIG. 23 is a view illustrating tilting movements of a monitoring device, according to an exemplary embodiment.
Figure 24:
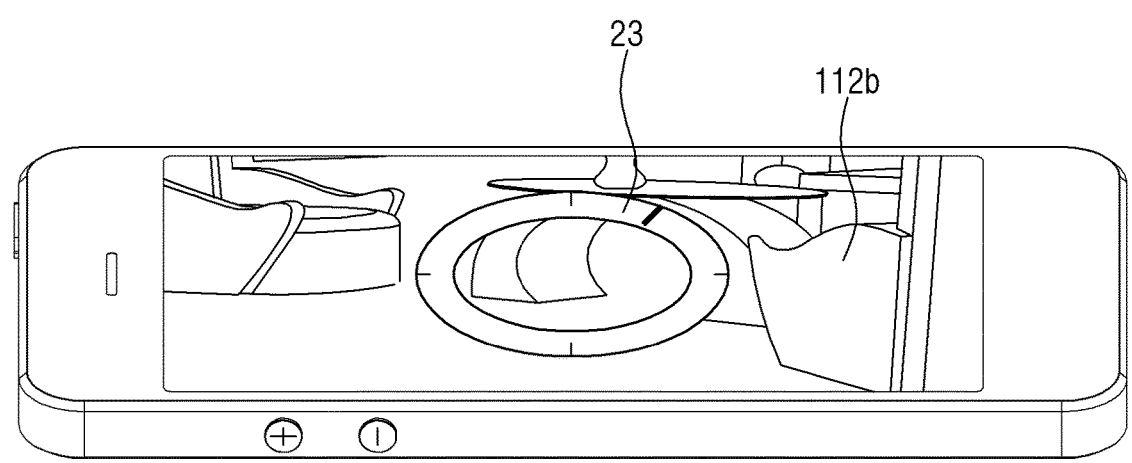
FIG. 24 is a view illustrating an image displayed on a monitoring device when the monitoring device is tilted downward, according to an exemplary embodiment.
Figure 25:
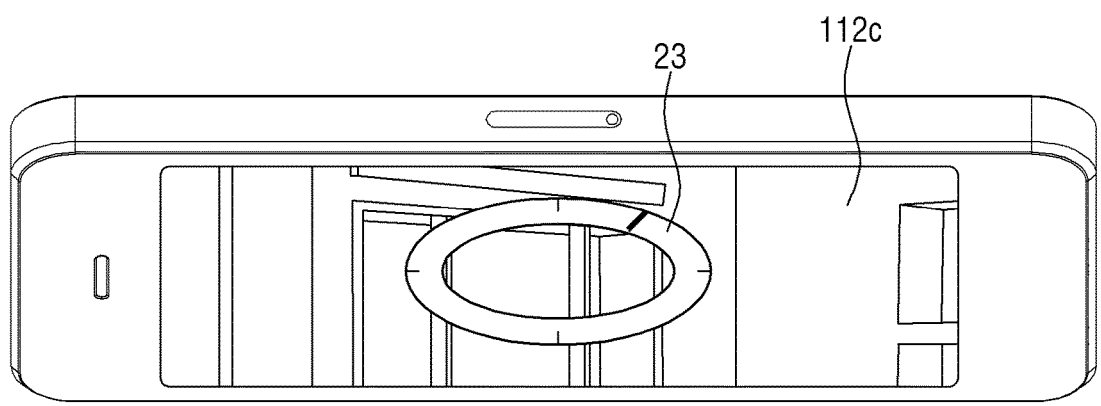
FIG. 25 is a view illustrating a monitoring device tilted upward according to an exemplary embodiment.

FIG. 23 is a view illustrating a state in which the monitoring device 1 is tilted upward and downward according to an exemplary embodiment. FIG. 24 is a view illustrating a state in which, as a result of tilting the monitoring device 1 in FIG. 23 downward, an image displayed thereon is also tilted downward. FIG. 25 is a view illustrating a state in which, as a result of tilting the monitoring device 1 in FIG. 23 upward, an image displayed thereon is also tilted upward.

An image according to an exemplary embodiment may be tilted in addition to being panned. For example, an image may be tilted as the camera 2, which is a pan-tilt camera 2, tilts. Alternatively, an image may be tilted by software installed in the monitoring device 1 when the camera 2 is a 360°-camera.

The monitoring device 1 according to an exemplary embodiment may further include a gyro sensor. The gyro sensor is a sensor that measures a change in an azimuth of a rotating object. The gyro sensor may obtain an amount of rotation of an object by reversely estimating a position of an origin using the gyro effect which is generated when the object is rotated. There are various types of gyro sensors such as a mechanical type that is directly rotated in three axes, a micro-electro-mechanical-systems type using a tuning fork using a Coriolis force, and an optical type using a difference in arrival times of laser. Generally, Micro-Electro-Mechanical Systems (MEMS) type gyro sensor has the smallest size and is mounted in a small device that may be carried by a user. However, a type of the gyro sensor is not limited thereto, and various other types of gyro sensors may be used for the monitoring device 1.

If the monitoring device 1 is implemented as a smartphone, a tablet PC, and the like, as illustrated in FIG. 23, the user may easily tilt the monitoring device 1 upward or downward. When the monitoring device 1 is tilted, a gyro sensor included in the monitoring device 1 may measure a degree of tilting and transmit a corresponding signal. The processor 14 of the monitoring device 1 may receive the signal, calculate a value of tilting of an image, and transmit the calculated value to the display 11. Then, the display 11 may tilt an image in accordance with the value and displays the tilted image.

When the monitoring device 1 is tilted downward, as illustrated in FIG. 24, a live view 112b is also tilted downward and displayed on the display 11. Conversely, when the monitoring device 1 is tilted upward, as illustrated in FIG. 25, a live view 112c is also tilted upward and displayed on the display 11.

When the camera 2 is a 360°-camera, images of capturing areas in all directions may be acquired and stored. Therefore, an image may be easily tilted in the case of a playback image as well as the live view 112.

Even in the case of panning an image, when the user directly pans the monitoring device 1 using the gyro sensor, the camera 2 may also be panned along with the monitoring device 1. However, when the user is sitting or walking along the street, there is an inconvenience of having to rotate his or her upper body leftward or rightward to pan the monitoring device 1. However, when tilting using the gyro sensor, the user may easily tilt the monitoring device 1 only with a snap of a wrist without rotating his or her upper body.

Figure 26:
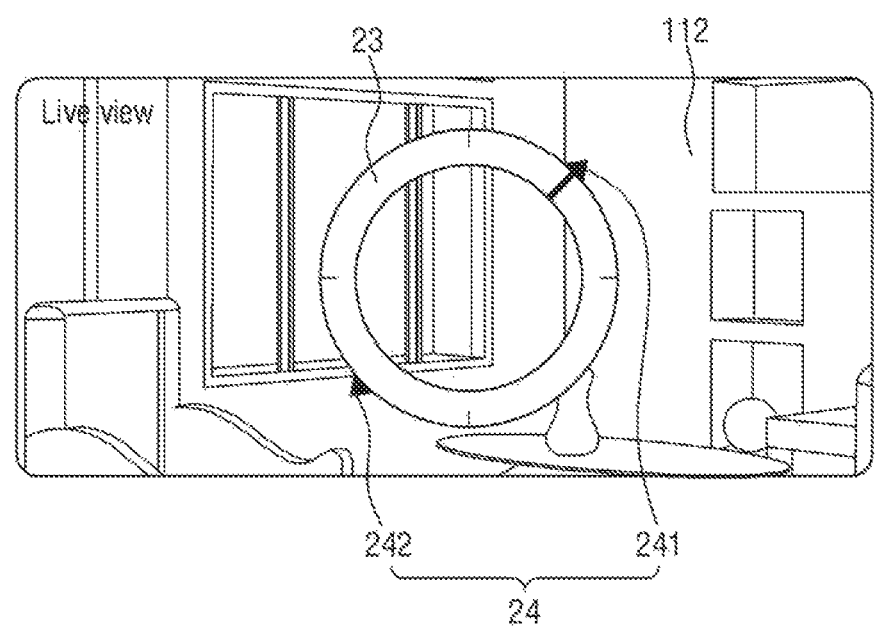
FIG. 26 is a view illustrating a screen of a monitoring device displaying a tilting control icon around a panning control icon, according to an exemplary embodiment.

FIG. 26 is a view illustrating a state in which a tilting control icon 24 is displayed around the panning control icon 23 according to another embodiment of the present disclosure.

As illustrated in FIG. 26, the tilting control icon 24 may be displayed around the panning control icon 23 in a display 11 of a monitoring device 1 according to an exemplary embodiment. The tilting control icon 24 may be formed in a diametric direction of the panning control icon 23, particularly, in a direction identical to that of the direction line 232 displayed in the panning control icon 23. The tilting control icon 24 includes a first icon 241 which is adjacent to the direction line 232, and a second icon 242 which is at a position opposite to the first icon 241. Although the first and second icons 241 and 242 of the tilting control icon 24 are formed at an outer peripheral surface of the panning control icon 23 in FIG. 26, exemplary embodiments are not limited thereto, and the first and second icons 241 and 242 of the tilting control icon 24 may also be formed at an inner peripheral surface of the panning control icon 23.

Since the tilting control icon 24 is formed in the direction identical to that of the direction line 232, when the direction line 232 moves on the panning control icon 23, the tilting control icon 24 moves along with the direction line 232. In this case, the first icon 241 moves to be adjacent to the direction line 232, and the second icon 242 moves to maintain the opposite position. Although each of the first icon and the second icon 242 has a triangular shape in FIG. 26, exemplary embodiments are not limited thereto, and each of the first icon and the second icon 242 may also have various other shapes such as a quadrilateral shape and a semicircular shape.

Figure 27:
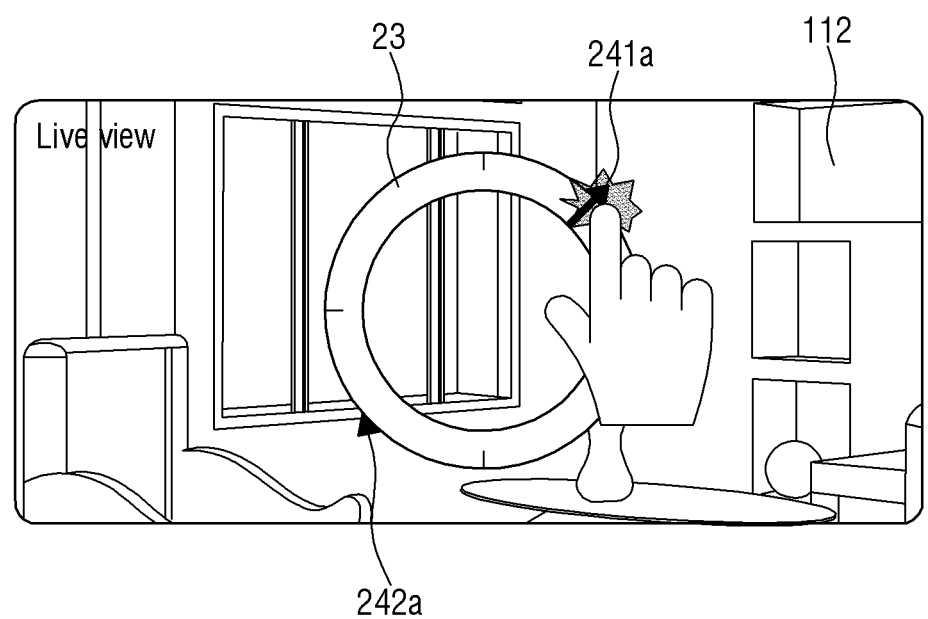
FIG. 27 is a view illustrating a user input of tapping a first icon of a tilting control icon, according to an exemplary embodiment.
Figure 28:
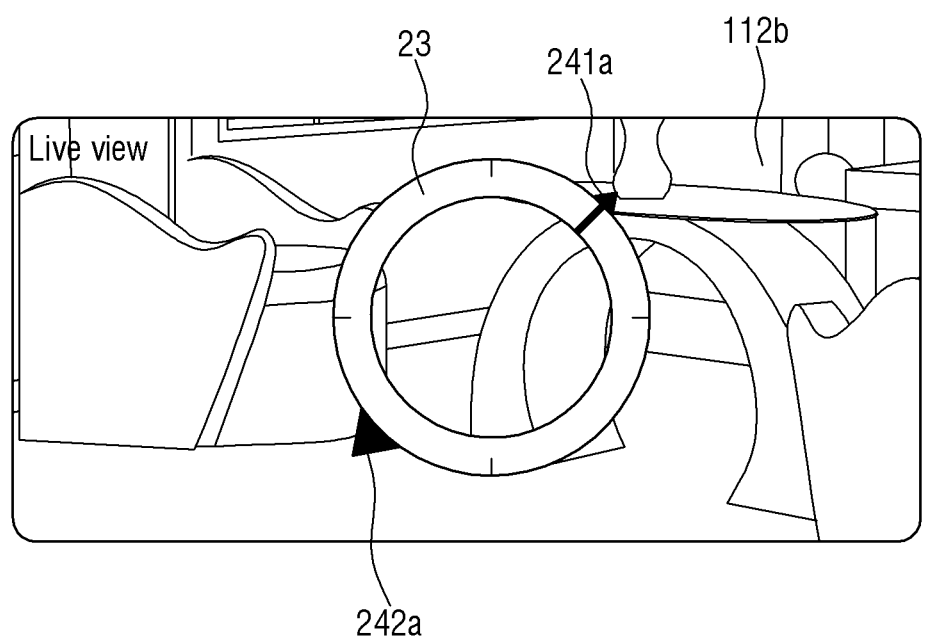
FIG. 28 is a view illustrating a screen of a monitoring device after a first icon of a tilting control icon is tapped, according to an exemplary embodiment.

FIG. 27 is a view illustrating a state in which a first icon 241a of a tilting control icon is tapped, and FIG. 28 is a view illustrating a state in which, as a result of tapping in FIG. 27, a displayed image is tilted downward.

When a user taps the first icon 241a as illustrated in FIG. 27, the displayed image may be tilted downward and the live view 112b may be displayed on the display 11 as illustrated in FIG. 28. In this case, to inform the user of a direction in which tilting is performed, the size of the first icon 241a of the tilting control icon is reduced, and the size of a second icon 242a is enlarged as shown in FIG. 28.

Conversely, although not illustrated in the drawings, when the user taps the second icon 242a, the displayed image may be tilted upward and a live view 112c may be displayed on the display 11. In this case, to inform the user of a direction in which tilting is performed, the size of the first icon 241a of the tilting control icon may be enlarged, and the size of the second icon 242a may be reduced.

When the user inputs a command to the monitoring device 1 using a mouse, the live view 112 may be tilted and displayed on the display 11 when the first icon 241a or the second icon 242a are clicked.

Figure 29:
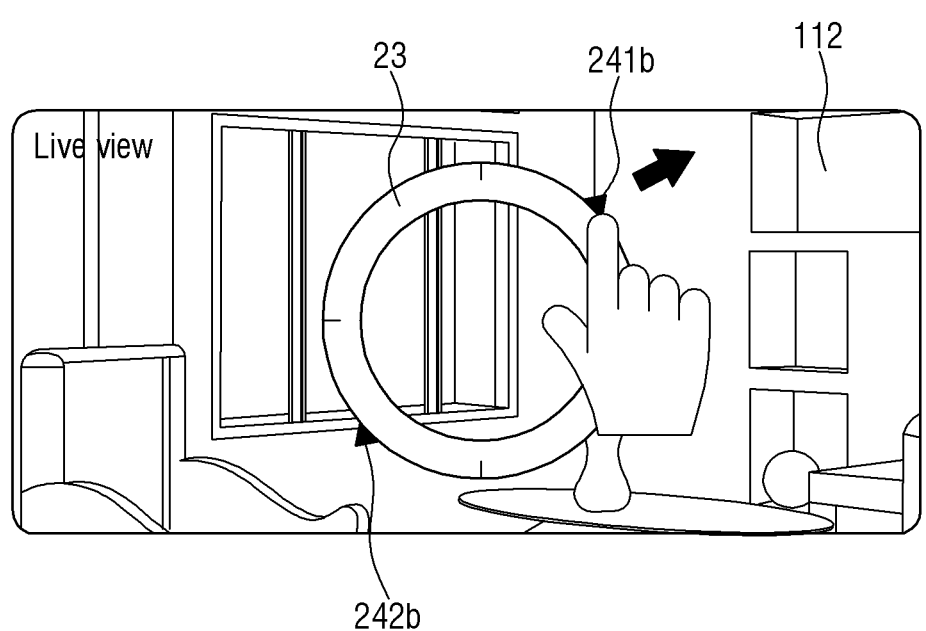
FIG. 29 is a view illustrating a user input of dragging a tilting control icon, according to an exemplary embodiment.
Figure 30:
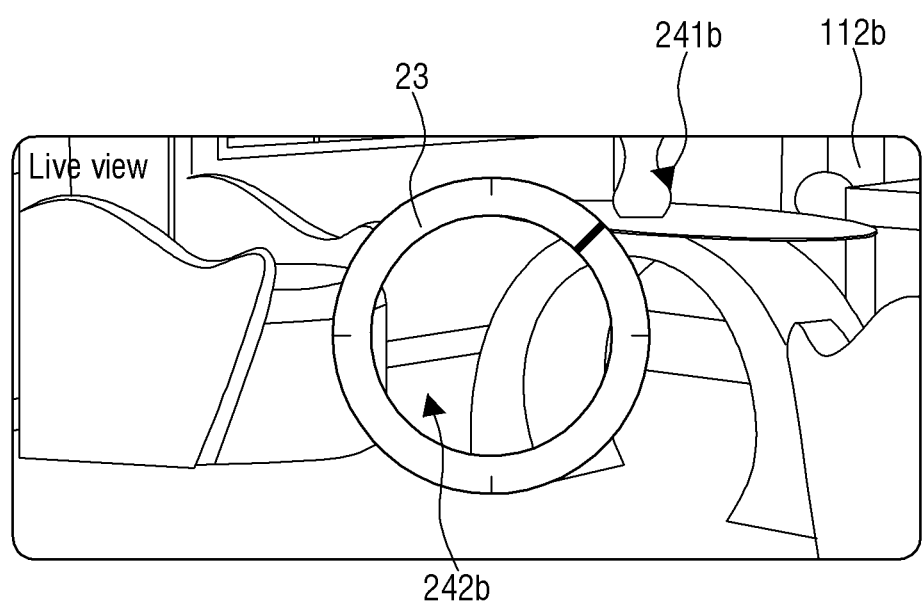
FIG. 30 is a view illustrating a screen of a monitoring device after a tilting control icon is dragged, according to an exemplary embodiment.

FIG. 29 is a view illustrating a state in which a tilting control icon 24 in FIG. 26 is dragged, and FIG. 30 is a view illustrating a state in which, as a result of dragging in FIG. 29, a displayed image is tilted downward.

According to another exemplary embodiment, the user may drag a first icon 241b or a second icon 242b as shown in FIG. 29.

When the user performs dragging in a direction indicated by the direction line 232 as illustrated in FIG. 29, the displayed image may be tilted downward and the live view 112b may be displayed on the display 11 as illustrated in FIG. 30. In this case, to inform the user of a direction in which tilting is performed, the first icon 241b and the second icon 242b may be dragged in the direction indicated by the direction line 232 as shown in FIG. 30.

Conversely, although not illustrated in the drawings, when the user performs dragging in a direction opposite to the direction indicated by the direction line 232 in FIG. 29, the displayed image may be tilted upward. In this case, to inform the user of a direction in which tilting is performed, the first icon and the second icon 242b may be dragged in the direction opposite to the direction indicated by the direction line 232 in FIG. 29.

When the user inputs a command to the monitoring device 1 using a mouse, the live view 112 (i.e., displayed image) may be tilted when the first icon 241b and the second icons 241b and 242b are dragged.

When the camera 2 is a 360°-camera, images of capturing areas in all directions are acquired and stored. Therefore, an image may be easily tilted in the case of a playback image as well as the live view 112.

Figure 31:
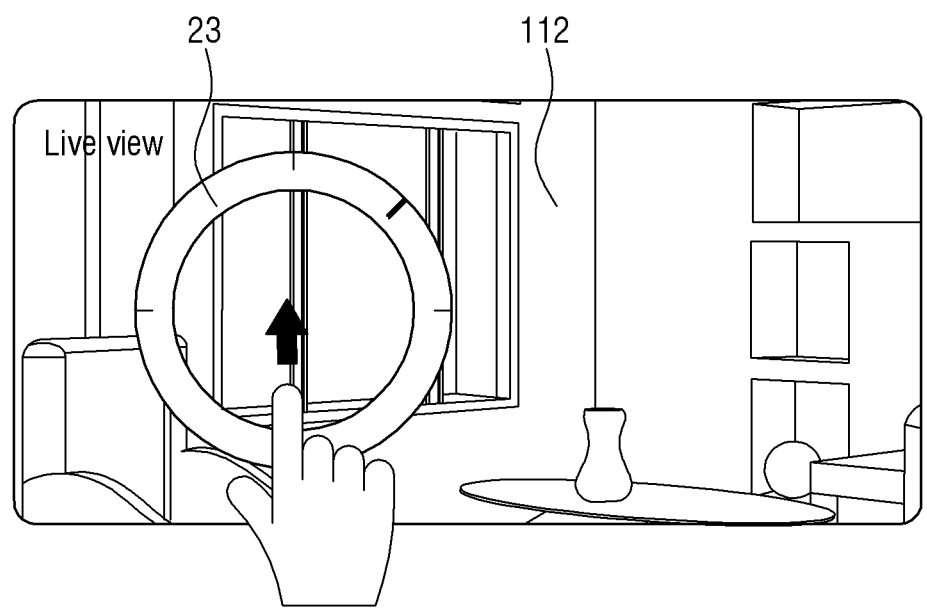
FIG. 31 is a view illustrating a user input of dragging a touch point inside a panning control icon, according to an exemplary embodiment.
Figure 32:
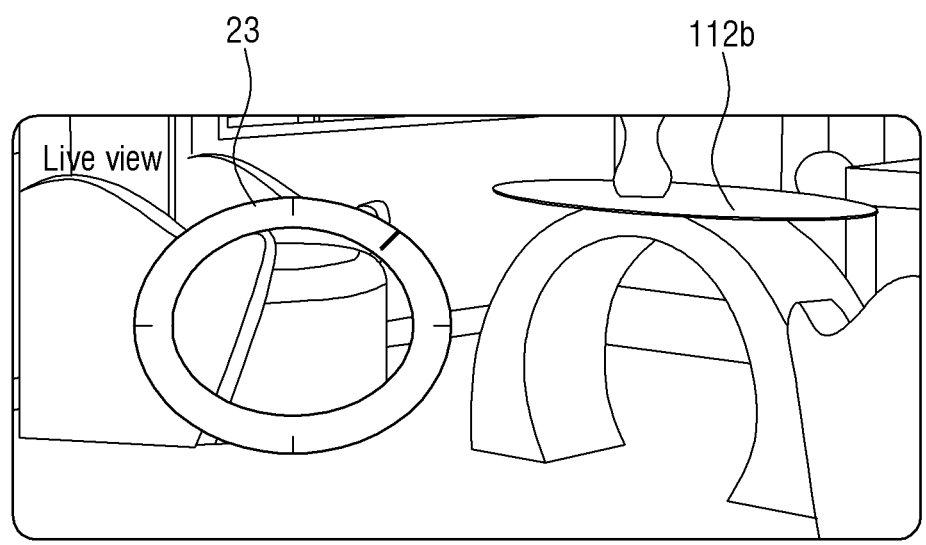
FIG. 32 is a view illustrating a screen of a monitoring device after a touch point is dragged inside a panning control icon, according to an exemplary embodiment.

FIG. 31 is a view illustrating a state in which dragging is performed inside the panning control icon 23, and FIG. 32 is a view illustrating a state in which, as a result of dragging in FIG. 31, a displayed image is tilted downward.

According to still another exemplary embodiment, as illustrated in FIG. 31, a user touches an approximately central area, i.e., an area surrounded by the ring-shaped area, of the panning control icon 23. Then, when dragging is performed immediately in a direction in which tilting is desired to be performed, as illustrated in FIG. 32, the displayed image may be tilted downward and a live view 112b may be displayed on the display 11. In this case, to inform the user of a direction in which tilting is performed, the panning control icon 23 may be also tilted downward as shown in FIG. 32. Here, when the touch is held for a predetermined amount of time or more before dragging is performed, the panning control icon 23 may be dragged, as described earlier with reference to FIGS. 11-12. Therefore, when the user wants to tilt the displayed image by a dragging gesture, dragging should be immediately performed after a touch is made.

When the user inputs a command to the monitoring device 1 using a mouse, the displayed image may be tilted when the user drags the approximately central area of the panning control icon 23 using the mouse.

When the camera 2 is a 360°-camera, images of capturing areas in all directions are acquired and stored. Therefore, an image may be easily tilted in the case of a playback image as well as the live view 112.

Figure 33:
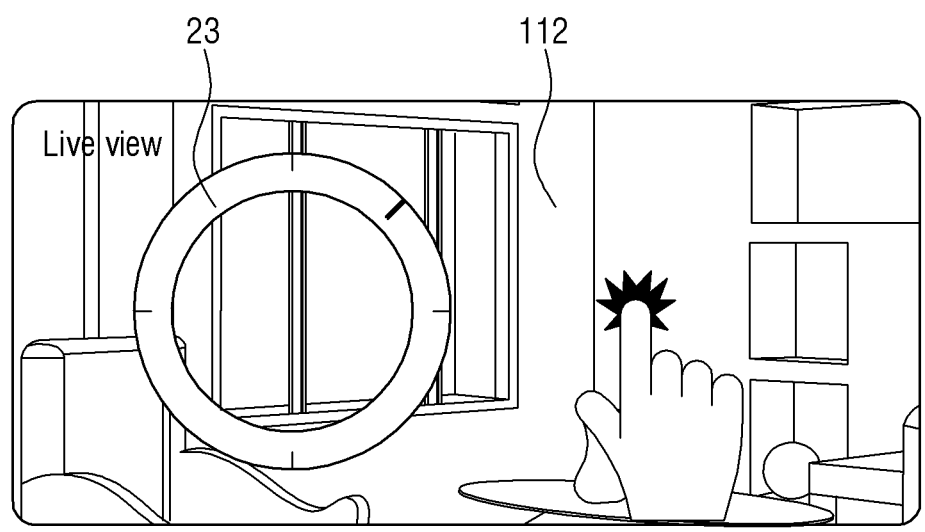
FIG. 33 is a view illustrating a user input of tapping an area outside a panning control icon, according to an exemplary embodiment.
Figure 34:
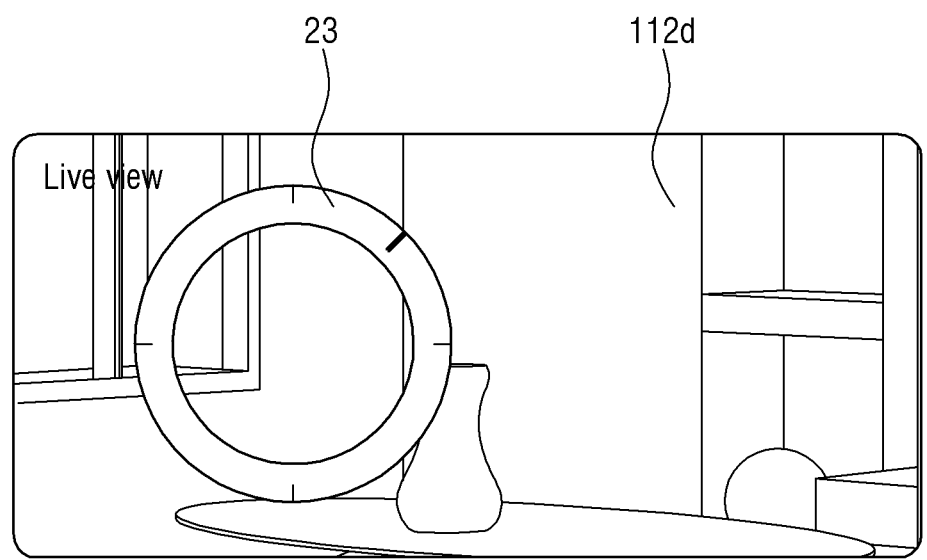
FIG. 34 is a view illustrating a screen of a monitoring device after an area outside a panning control icon is tapped, according to an exemplary embodiment.
Figure 35:
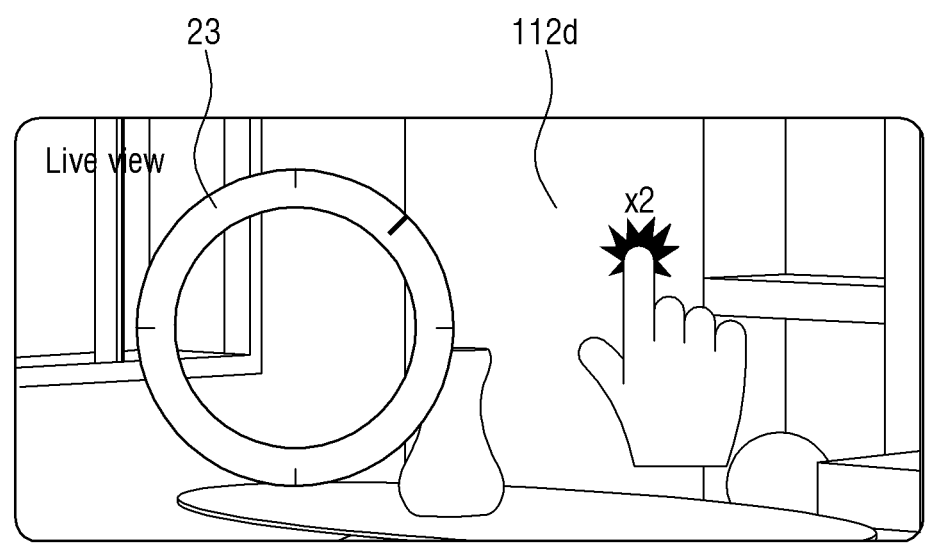
FIG. 35 is a view illustrating a user input of double-tapping an area outside a panning control icon, according to an exemplary embodiment.
Figure 36:
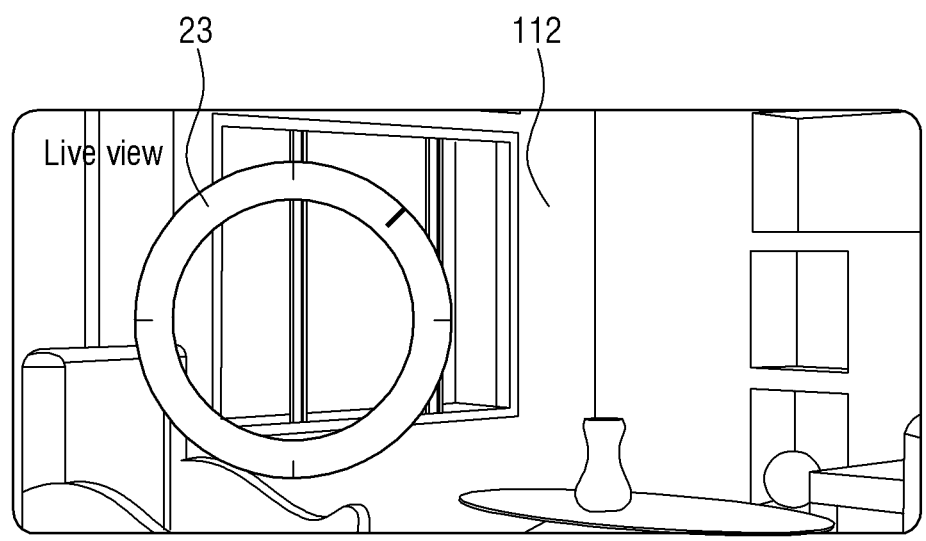
FIG. 36 is a view illustrating a screen of a monitoring device after an area outside a panning control icon is double-tapped, according to an exemplary embodiment.

FIG. 33 is view illustrating a state in which another area in which the panning control icon 23 is not displayed, is tapped according to an exemplary embodiment, and FIG. 34 is a view illustrating a state in which, as a result of tapping in FIG. 33, a displayed image is zoomed in. FIG. 35 is a view illustrating a state in which another area in which the panning control icon 23 is not displayed, is double-tapped according to an exemplary embodiment, and FIG. 36 is a view illustrating a state in which, as a result of double-tapping in FIG. 35, a displayed image is zoomed out.

A user may change a scale of a displayed image by zooming in or zooming out. When, as illustrated in FIG. 33, the user taps an area in the display 11 other than that in which the panning control icon 23 is displayed, a displayed image such as a live view 112d or playback may be zoomed in as illustrated in FIG. 34. When the user performs double-tapping as illustrated in FIG. 35, a displayed image such as a live view 112 or playback may be zoomed out as illustrated in FIG. 36. The displayed image may be zoomed in or zoomed out with respect to a point at which the user performs tapping or double-tapping.

In an exemplary embodiment, a displayed image may be zoomed in when a user uses two fingers to pinch out an area other than that in which the panning control icon 23 is displayed, and a displayed image may be zoomed out when the user uses two fingers to pinch in an area other than that in which the panning control icon 23 is displayed.

In an exemplary embodiment, a displayed image may be zoomed in or zoomed out when the user double-taps an area on the display 11 other than that in which the panning control icon 23 is displayed. In this case, a display image may toggle between zoom-in and zoom-out every time the image is double-tapped. In this case, two scales, a zoom-in scale and a zoom-out scale, should be preset.

When the user inputs a command to the monitoring device 1 using a mouse, the user may place a mouse cursor over on a live view 112 and scroll a mouse wheel upward or downward to zoom in or zoom out on the live view 112. Alternatively, although not illustrated in the drawings, a menu may be displayed such that the user may zoom in or zoom out on a live view 112 by clicking the menu.

Those of ordinary skill in the art to which the present disclosure pertains should understand that the present disclosure may be embodied in other specific forms without changing the technical spirit or essential features thereof. Thus, the embodiments described above should be understood as illustrative in all aspects instead of limiting. The scope of the present disclosure is indicated by the claims below rather than by the detailed description above, and all changes or modifications derived from the meaning and scope of the claims and their equivalents should be construed as belonging to the scope of the present disclosure.

The invention claimed is:

1. A monitoring device comprising:
    a display configured to display an image acquired by a camera; and
    a processor configured to:
        control the display to display a panning control icon including an area corresponding to a panning range of the image and a direction of the camera,
        detect an input of selecting one point from the area of the panning control icon,
        determine a target panning direction based on a position of the selected one point on the panning control icon,
        perform panning on the image in the target panning direction,
        display a direction marker at the position of the selected one point, and
        change a position of the panning control icon in response to detecting a drag-and-drop input on the panning control icon.

2. The monitoring device of claim 1, wherein the panning control icon includes a portion of a ring shape.

3. The monitoring device of claim 2, wherein the panning control icon is a closed ring shape when the panning range of the image is 360°, and is a ring shape having an opening when the panning range of the image is less than 360°, wherein the opening represents an angle range in which panning is not available on the image.

4. The monitoring device of claim 2, wherein the processor is further configured to:
    detect a touch-and-hold input on an area surrounded by the portion of a ring shape, and
    control the display to display a window for setting color and transparency of the panning control icon in response to detecting the touch-and-hold input.

5. The monitoring device of claim 1, wherein the panning control icon further includes at least one guideline which indicates a reference panning direction.

6. The monitoring device of claim 1, wherein the processor is further configured to:

in response to detecting a flick input on the panning control icon, control the panning control icon to disappear in accordance with the flick input.

7. The monitoring device of claim 1, wherein the processor is further configured to:
    detect a pinch input in a vicinity of the panning control icon, and
    reduce a size of the panning control icon if the pinch input is a pinch-in input, and enlarge the size of the panning control icon if the pinch input is a pinch-out input.

8. The monitoring device of claim 2, wherein the processor is further configured to:
    control the display to display a tilting control icon for controlling tilting of the image, wherein the tilting control icon includes a first icon displayed near the direction marker and a second icon displayed in an opposite direction about a center of the ring shape,
    in response to detecting an input of selecting the first icon, reduce a size of the first icon and enlarge a size of the second icon, and
    in response to detecting an input of selecting the second icon, enlarge the size of the first icon and reduce the size of the second icon.

9. The monitoring device of claim 8, wherein the processor is further configured to tilt the image downward in response to detecting an input of dragging the tilting control icon toward the first icon from the second icon, and tilt the image upward in response to detecting an input of dragging the tilting control icon toward the second icon from the first icon.

10. The monitoring device of claim 1, further comprising a gyro sensor, wherein the processor is further configured to tilt the image based on a sensing value measured by the gyro sensor.

11. The monitoring device of claim 2, wherein the processor is further configured to:
    detect a drag input on an area surrounded by the ring shape, and
    tilt the image in accordance with a dragging direction of the drag input.

12. The monitoring device of claim 2, wherein the processor is further configured to:
    detect a tap input or a double-tap input from an area that is not adjacent to the panning control icon, and
    zoom in on the image in response to detecting the tap input, and zoom out on the image in response to detecting the double-tap input.

13. A monitoring method performed by a monitoring apparatus, the method comprising:
    displaying an image acquired by a camera on a display of the monitoring apparatus;
    displaying a panning control icon including an area corresponding to a panning range of the image and a direction of the camera on the display;
    detecting an input of selecting one point from the area of the panning control icon;
    determining a target panning direction based on a position of the selected one point on the panning control icon;
    panning the image in the target panning direction;
    displaying a direction marker at the position of the selected one point; and
    changing a position of the panning control icon in response to detecting a drag-and-drop input on the panning control icon.

14. The monitoring method of claim 13, wherein the displaying of the panning control icon on the display includes:
    displaying a starting icon on a boundary area of the image;
    detecting a drag-and-drop input on the starting icon; and
    displaying the panning control icon on a point at which the starting icon is dropped according to the drag-and-drop input.

15. The monitoring method of claim 13, wherein:
    the panning control icon includes a portion of a ring shape,
    the panning control icon is a closed ring shape when the panning range of the image is 360°, and is a ring shape having an opening when the panning range of the image is less than 360°, and
    the opening represents an angle range in which panning is not available on the image.

16. The monitoring method of claim 15, further comprising:
    displaying a tilting control icon for controlling tilting of the image, wherein the tilting control icon includes a first icon displayed near the direction marker and a second icon displayed in an opposite direction about a center of the ring shape;
    tilting the image downward when an input of selecting the first icon of the tilting control icon is detected; and
    tilting the image upward when an input of selecting the second icon of the tilting control icon is detected.

17. A monitoring system comprising:
    a camera configured to acquire an image; and
    a monitoring device configured to display the image acquired by the camera,
    wherein the monitoring device includes:
        a transceiver configured to receive the image from the camera;
        a memory configured to store the image;
        a display configured to display the image; and
        a processor configured to:
            control the display to display a panning control icon including an area corresponding to a panning range of the image and a direction of the camera,
            detect an input of selecting one point from the area of the panning control icon,
            determine a target panning direction based on a position of the selected one point on the panning control icon,
            perform panning on the image in the target panning direction,
            display a direction marker at the position of the selected one point, and
            change a position of the panning control icon in response to detecting a drag-and-drop input on the panning control icon.

18. The monitoring system of claim 17, wherein:
    the panning control icon includes a portion of a ring shape,
    the panning control icon is a closed ring shape when the panning range of the image is 360°, and is a ring shape having an opening when the panning range of the image is less than 360°, and
    the opening represents an angle range in which panning is not available on the image.

19. The monitoring system of claim 18, wherein the processor is further configured to:
    control the display to display a tilting control icon for controlling tilting of the image, wherein the tilting control icon includes a first icon displayed near the direction marker and a second icon displayed in an opposite direction about a center of the ring shape, tilt the image downward when an input of selecting the first icon is detected, and tilt the image upward when an input of selecting the second icon is detected.

* * * * *